US011362894B2

(12) United States Patent
Uematsu et al.

(10) Patent No.: US 11,362,894 B2
(45) Date of Patent: Jun. 14, 2022

(54) WIRING MANAGEMENT SYSTEM AND WIRING MANAGEMENT METHOD

(71) Applicant: Nippon Telegraph and Telephone Corporation, Tokyo (JP)

(72) Inventors: Yoshihiko Uematsu, Musashino (JP);
Hiroshi Yamamoto, Musashino (JP);
Hiroki Kawahara, Musashino (JP);
Katsuhiro Araya, Musashino (JP);
Toshiyuki Oka, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 81 days.

(21) Appl. No.: 17/041,570

(22) PCT Filed: Mar. 19, 2019

(86) PCT No.: PCT/JP2019/011526
§ 371 (c)(1),
(2) Date: Sep. 25, 2020

(87) PCT Pub. No.: WO2019/188603
PCT Pub. Date: Oct. 3, 2019

(65) Prior Publication Data
US 2021/0014585 A1    Jan. 14, 2021

(30) Foreign Application Priority Data

Mar. 29, 2018 (JP) .............................. JP2018-064379

(51) Int. Cl.
*H04L 41/0873* (2022.01)
*H04L 41/12* (2022.01)
(Continued)

(52) U.S. Cl.
CPC ...... *H04L 41/0873* (2013.01); *H04L 12/2885* (2013.01); *H04L 41/0853* (2013.01);
(Continued)

(58) Field of Classification Search
CPC ............. H04L 41/0873; H04L 12/2885; H04L 41/0853; H04L 41/12; H04L 61/6022; H04L 67/16; H04Q 11/0478
See application file for complete search history.

(56) References Cited

U.S. PATENT DOCUMENTS 8,015,359 B1 * 9/2011 Favor .................. G06F 12/0815
711/205
2004/0190905 A1 9/2004 Kano
(Continued)

FOREIGN PATENT DOCUMENTS

JP 2004-297522 10/2004
JP 2005-303924 10/2005

OTHER PUBLICATIONS

Sakamaki et al., "Optical switching technology for more flexible optical nodes," NTT Technical Journal, 2013, 25(11):16-20, 13 pages (with English Translation).

*Primary Examiner* — Samina F Choudhry
(74) *Attorney, Agent, or Firm* — Fish & Richardson P.C.

(57) ABSTRACT

When separate service apparatuses that provide various communication services to users are connected by a wiring with communication functional units interposed, if there is a wiring abnormality, the location of the abnormality is easily identified. When a wiring connection is completed between separated service apparatuses X and Y that provide various communication services to user terminals 31 and 32 with communication functional units A1 and B2 interposed, a wiring management system 10A includes a transmission network management apparatus 14A that identifies a wiring abnormality. The transmission network management apparatus 14A associates endpoint names of the service apparatuses X and Y and of the functional units A1 and B2 with opposite endpoint names on the opposite sides, defines opposite endpoint IDs of the endpoints of the functional
(Continued)

units A1 and B2 as expected values, and saves the end points in association with the opposite endpoint IDs in a DB 14*b*. Upon completing the wiring connection between the service apparatuses X and Y, an opposite endpoint ID of each of the functional units A1 and B2 and the service apparatuses X and Y opposite to predetermined functional units A1 and B2 is received as a received value via a wiring, and if the received value does not match the expected value, it is determined that the wiring is abnormal.

8 Claims, 13 Drawing Sheets

(51) Int. Cl.
      *H04L 101/622*    (2022.01)
      *H04L 67/51*    (2022.01)
      *H04Q 11/04*    (2006.01)
      *H04L 41/0853*    (2022.01)
      *H04L 12/28*    (2006.01)

(52) U.S. Cl.
      CPC .......... *H04L 41/12* (2013.01); *H04L 61/6022* (2013.01); *H04L 67/16* (2013.01); *H04Q 11/0478* (2013.01)

(56) References Cited

U.S. PATENT DOCUMENTS

2005/0232226 A1   10/2005   Sasaki et al.
2019/0121350 A1*   4/2019   Cella ................. G06Q 10/0639

\* cited by examiner

PATH CONNECTION INFORMATION PD

| FUNCTIONAL UNIT | ENDPOINT NAME | OPPOSITE ENDPOINT NAME | STATE | PATH P1 | PATH P2 | PATH P3 |
|---|---|---|---|---|---|---|
| A1 | A11 | B11 | ○/○ | ○ | | PROCESSING |
| A1 | A12 | A21 | —/○ | ○ | | PROCESSING |
| A2 | A21 | A12 | —/○ | ○ | | PROCESSING |
| A2 | A22 | A31 | SUSPECTED LOCATION 1 | | | PROCESSING |
| A3a | A31 | A22 | SUSPECTED LOCATION 1 | | | PROCESSING |
| B1 | B11 | A11 | ○/○ | ○ | | PROCESSING |
| B1 | B12 | B21 | SUSPECTED LOCATION 3 | | | PROCESSING |
| B2 | B21 | B12 | SUSPECTED LOCATION 3 | | | PROCESSING |
| B2 | B22 | C11 | ○/○ | | ○ | PROCESSING |
| C1 | C11 | B22 | ○/○ | | ○ | PROCESSING |
| C1 | C12 | C21 | —/○ | | ○ | PROCESSING |
| C2 | C21 | C12 | —/○ | | ○ | PROCESSING |
| C2 | C22 | C31 | SUSPECTED LOCATION 2 | | | PROCESSING |
| C3a | C31 | C22 | SUSPECTED LOCATION 2 | | | PROCESSING |

Fig. 10

WIRING MANAGEMENT SYSTEM AND WIRING MANAGEMENT METHOD

CROSS-REFERENCE TO RELATED APPLICATIONS

This application is a National Stage application under 35 U.S.C. § 371 of International Application No. PCT/JP2019/011526, having an International Filing Date of Mar. 19, 2019, which claims priority to Japanese Application Serial No. 2018-064379, filed on Mar. 29, 2018. The disclosure of the prior application is considered part of the disclosure of this application, and is incorporated in its entirety into this application.

TECHNICAL FIELD

The present invention relates to a wiring management system and a wiring management method for identifying a wiring abnormality when separate service apparatuses that provide various communication services to users are wired and connected.

BACKGROUND ART

A transmission network is formed by connecting transmission apparatuses distributed in thousands of buildings nationwide by transmission lines such as optical fibers. A transmission apparatus of this transmission network provides a communication function such as a transponder or a line interface that connects various service networks that provide various communication services, such as the Internet, telephone, and corporate virtual private network (VPN) services, to end users, through a transmission path for transmitting communication signals.

An operator of a service network constructs various communication service networks by connecting service apparatuses including communication apparatuses such as Internal protocol (IP) routers and Ethernet (trade name) switches by a group of transmission paths and provides various communication services from the service apparatuses to end users. However, the service apparatuses are distributed and arranged in each building similarly to the transmission apparatus.

FIG. 12 illustrates a configuration example of a wiring management system that detects and manages a connection state when the service apparatuses of each service network are connected by the transmission network of the transmission apparatus, and the description will be given.

In the wiring management system 10 illustrated in FIG. 12, a first building 11A includes a service network management apparatus 12X, a service apparatus X connected to the service network management apparatus 12X, and a first transmission apparatus A having a transmission apparatus management unit 13A to which a functional unit A1 and a functional unit A2 for communication, such as transponders are connected. A second building 11B includes a service network management apparatus 12Y, a service apparatus Y connected to the service network management apparatus 12Y, and a second transmission apparatus B having a transmission apparatus management unit 13B to which a functional unit B1 and a functional unit B2 are connected. Further, a transmission network management apparatus 14 connected to each of the transmission apparatus management units 13A and 13B is provided.

In the first building 11A, the service apparatus X and the functional unit A1 are connected by an in-building optical wiring 21 by using an optical fiber, and the functional unit A1 and the functional unit A2 are connected by an in-building optical wiring 22. Similarly, in the second building 11B, the service apparatus Y and the functional unit B2 are connected by an in-building optical wiring 23, and the functional unit B2 and the functional unit B1 are connected by an in-building optical wiring 24. The functional unit A2 of the first building 11A and the functional unit B1 of the second building 11B are connected by an inter-building optical transmission line 25 by using an optical fiber.

The transmission network management apparatus 14 manages a transmission network, and includes a database (DB) 14a in which a functional unit A1 table, a functional unit A2 table, a functional unit B1 table, and a functional unit B2 table are stored.

In the functional unit A1 table, an endpoint name A11 which is a unique name of one endpoint as a transmitting/receiving end of the functional unit A1 and an opposite endpoint name X1 which is a unique name of an endpoint as a transmitting/receiving end of the service apparatus X opposite to the functional unit A1 are stored in association with each other. Similarly, in the functional unit A1 table, an endpoint name A12 which is a unique name of the other endpoint of the functional unit A1 and an opposite endpoint name A21 which is a unique name of an endpoint of the functional unit A2 opposite to the functional unit A1 are stored in association with each other.

In the functional unit A2 table, one endpoint name A21 of the functional unit A2 and the opposite endpoint name A12 of the functional unit A1 opposite to the functional unit A2 are stored in associated with each other, and the other endpoint name A22 of the functional unit A2 and the opposite endpoint name B11 of the functional unit B1 opposite to the functional unit A2 are stored in association with each other.

In the functional unit B1 table, one endpoint name B11 of the functional unit B1 and the opposite endpoint name A22 of the functional unit A2 opposite to the functional unit B1 are stored in association with each other, and the other endpoint name B12 of the functional unit B1 and an opposite endpoint name B21 of the functional unit B2 opposite to the functional unit B1 are stored in association with each other.

In the functional unit B2 table, one endpoint name B21 of the functional unit B2 and the opposite endpoint name B12 of the functional unit B1 opposite to the functional unit B2 are stored in association with each other, and the other endpoint name B22 of the functional unit B2 and the opposite endpoint name Y1 of the service apparatus Y opposite to the functional unit B2 are stored in association with each other.

The service apparatus X is connected to a user terminal 31 of an end user, and the service apparatus Y is connected to a user terminal 32.

The functional units A1 and B2 are transponders in the present example, and the functional units A2 and B1 are line interfaces in present example. The transponder terminates a wavelength path signal (or wavelength signal) transmitted from the service apparatuses X and Y.

The line interface will be described with reference to FIG. 13. As illustrated in FIG. 13, the transmission apparatus A of the building 11A includes a plurality of line interfaces A2a and A2b and transponders A1a and A1b, and the line interfaces A2a and A2b, the line interfaces A2a and A2b, and the transponders A1a and A1b are connected by in-building optical wirings 22a, 22b, and 22c. The same applies to the transmission apparatus B of the building 11B.

For example, the line interface A2*b* has a function of multiplexing wavelength signals input from another line interface A2*a* and the transponder A1*b* and outputting the multiplexed signal to the inter-building optical transmission line 25*b*. The line interface A2*a* has a function of separating a wavelength multiplexed signal input from the inter-building optical transmission line 25*a* and distributing the signal to another line interface A2*b* or transponder A1*a*.

However, as illustrated in FIG. 14, when the transmission apparatus A accommodates many transponders A1*a* to A1*f*, A1*g* to A1*n*, the transmission apparatus A includes a multiplexing/demultiplexing unit 19*a* that multiplexes the wavelength signals from the transponders A1*a* to A1*f*, and a multiplexing/demultiplexing unit 19*b* that multiplexes the wavelength signals from the transponders A1*g* to A1*n*. The same applies to the transmission apparatus B.

In the wiring management system 10 having such a configuration, the operation of the maintenance person of each building 11A, 11B when wiring between the service apparatuses X and Y and between the functional units A1, A2, B1, and B2 (also described as functional units A1 and B2) with an optical fiber or the like will be described with reference to the sequence diagram of FIG. 15.

However, an operation terminal 15 of the service network illustrated in FIG. 15 is connected to the service apparatuses X and Y (FIG. 12), and an operation terminal 16 of the transmission network is connected to the transmission apparatuses A and B, respectively. An in-building facility 17 is a facility related to communication in each of the buildings 11A and 11B. A maintenance terminal 18 is used by a maintenance person of the in-building facility 17 and is disposed in each of the buildings 11A and 11B.

In step S1 of FIG. 15, the following wiring design is performed. That is, the operator of the service network uses the operation terminal 15 to design the capacity of the accommodated traffic of the connection path between the service apparatuses X and Y based on the traffic demand prediction of the service to be provided. Based on the designed accommodated traffic capacity, the operators of the service network and the transmission network cooperate to design the connection relationship between the service apparatuses X and Y and the transmission apparatuses A and B by using the operation terminals 15 and 16. Further, the operator of the transmission network designs the connection relationship between the transmission apparatuses A and B and the connection relationship between the functional units A1 and B2 to add by using the operation terminal 16.

In step S2, each operator of the service network and the transmission network issues a wiring order from the operation terminals 15 and 16 to the maintenance person via the maintenance terminal 18 as follows. That is, because the buildings 11A and 11B are located at remote locations from each other, the wiring order is issued by transmitting the wiring order information based on the design contents in step S1 from the operation terminals 15 and 16 of the buildings 11A and 11B to the maintenance terminal 18 of the buildings 11A and 11B.

In step S3, the maintenance person of each of the buildings 11A and 11B performs the wiring work of the in-building facility 17 based on the design contents based on the wiring order information notified to the maintenance terminal 18. At this time, wiring work is also performed between the service apparatuses X and Y, between the functional units A1 and B2, and between the transmission apparatuses A and B.

In step S4, the operator of the service network uses the operation terminal 15 to perform the following service apparatus configuration definition for the service network management apparatuses 12X and 12Y. This service apparatus configuration definition means that, when the service apparatuses X and Y of the service network management apparatuses 12X and 12Y are, for example, routers, various setting information is entered into the routers to set the routers. This service apparatus configuration definition is reflected in the in-building facility 17 in step S5.

In step S6, the operator of the transmission network performs the following transmission apparatus configuration definition for the transmission network management apparatus 14 by using the operation terminal 16. The transmission apparatus configuration definition means that various setting information is entered into the transponders A11 and B11 in the transmission network management apparatus 14, for example to set the transponders.

Further, the transmission apparatus configuration definition includes setting of a connection relationship between the opposite endpoints including the opposite points of the service apparatuses X and Y for each of the endpoints A11, A12, A21, A22, B11, B12, B21, and B22 (also described as endpoints A11 to B22) of each of the functional units A1 and B2. This means that the endpoint name and the opposite endpoint name are stored in the DB 14*a* of the transmission network management apparatus 14 in association with each other. Such a transmission apparatus configuration definition is reflected in the in-building facility 17 in step S7.

Finally, in step S8, the operator of the transmission network opens a transmission path connecting the service apparatuses X and Y with the operation terminal 16 and flows a signal between the service apparatuses X and Y via the transmission path.

In optical transmission systems as this type of wiring management system, the flexibility of setting wavelength paths such as colorless, directionless, and contentionless has been improved, and a transponder connected to an arbitrary port of a line interface or a multiplexing/demultiplexing unit can transmit and receive an optical signal of an arbitrary wavelength as described in Non-Patent Literature 1.

CITATION LIST

Patent Literature

Non-Patent Literature 1: Yohei Sakamaki and two others, "Optical Switch Technology for Achieving Flexible Optical Nodes (より柔軟な光ノードを実現する光スイッチ技術)", NTT Technical Journal, 2013 November, pp. 16-20.

SUMMARY OF THE INVENTION

Technical Problem

However, in the wiring management system 10 described above, when the maintenance person checks the wiring connection after the wiring connection, the maintenance operation cannot be performed unless the transmission path between the service apparatuses X and Y is opened in step S8 in FIG. 15. That is, it is possible to determine a wiring abnormality in the in-building facility 17 by passing a signal between the service apparatuses X and Y via the transmission path after the transmission path is opened.

In the determination, as illustrated in step S9 of FIG. 15, when a wiring abnormality is detected between the service apparatuses X and Y, as indicated by the arrows J1, J2, and J3, the maintenance person is urged to recheck an actual wiring connection, and the operators of the service network and the transmission network are urged to recheck the configuration definition by the data input setting. In this rechecking, the wiring abnormality of the transmission path between the service apparatuses X and Y can be identified, but it is not possible to identify one between the functional units A1 and B2, between the functional units A1 and B2, and between the service apparatuses X and Y. For this reason, it is necessary for a person to check individually, and a reworking operation requiring a lot of man-hours is required.

The present invention has been made in view of such circumstances, and an object of the present invention to provide a wiring management system and a wiring management method capable of easily identifying an abnormal location if there is a wiring abnormality when separate service apparatuses that provide various communication services to users are wired and connected with communication functional units interposed.

Means for Solving the Problem

As means for solving the above problems, the invention according to claim 1 is a wiring management system including separate service apparatuses configured to provide various communication services to user terminals via a service network, a transmission apparatus configured to connect the service apparatuses through a transmission network with a plurality of communication functional units interposed in the transmission network, and a transmission network management apparatus configured to identify a wiring abnormality of the connected transmission network, in which the transmission network management apparatus includes a database (DB) configured to store information related to the plurality of functional units, an endpoint name definition unit configured to define endpoint names which are unique names of endpoints as transmitting/receiving ends of the service apparatuses, and endpoint names which are unique names of endpoints as transmitting/receiving ends of the plurality of functional units and save each of the defined endpoint names in association with an opposite endpoint name which is an endpoint name on the opposite side of each endpoint in the DB, an ID definition unit configured to define a unique endpoint identification (ID) for each of endpoints of the service apparatuses and each of endpoints of the plurality of functional units, an expected value management unit configured to define opposite endpoint IDs on the opposite sides of the endpoints as expected values and associate the endpoint names of the endpoints of the plurality of functional units with the opposite endpoint IDs and save the associated endpoint names in pairs with the expected values in the DB, a received value management unit configured to, upon completing a wiring connection between the service apparatuses, receive an opposite endpoint ID on an opposite side of an endpoint in the plurality of functional units via a wiring as a received value, receive an opposite endpoint ID of the service apparatus opposite to a predetermined functional unit among the plurality of functional units via a wiring as a received value, and save the received values in pairs with the expected value of the same opposite endpoint ID in the DB, and a wiring determination unit configured to determine that there is a wiring abnormality if the received values and the expected value of the same opposite endpoint ID saved in the DB do not match.

The invention according to claim 8 is a wiring management method for wiring and connecting between separate service apparatuses that provide various communication services to user terminals via a service network through a transmission network with a plurality of communication functional units interposed in the transmission network and identifying a wiring abnormality in the connected transmission network by a transmission network management apparatus, in which the transmission network management apparatus includes a DB configured to store information related to the plurality of functional units, a defining endpoint names which are unique names of endpoints as transmitting/receiving ends of the service apparatuses, and endpoint names which are unique names of endpoints as transmitting/receiving ends of the plurality of functional units and saving each of the defined endpoint names in association with an opposite endpoint name which is an endpoint name on an opposite side of the endpoint in the DB, defining a unique endpoint ID for each endpoint of the service apparatuses and each of the endpoints of the plurality of functional units, defining opposite endpoint IDs on the opposite sides of the endpoints as expected values and associating the endpoint names of the endpoints of the plurality of functional units with the opposite endpoint IDs and saving the associated endpoint names in pairs with the expected values in the DB, upon completing a wiring connection between the service apparatuses, receiving an opposite endpoint ID on an opposite side of an endpoint in the plurality of functional units via a wiring as a received value, receiving an opposite endpoint ID of the service apparatus opposite to a predetermined functional unit among the plurality of functional units via a wiring as a received value, and saving the received values in pairs with the expected value of the same opposite endpoint ID in the DB, and determining a wiring abnormality if the received values and the expected value of the same opposite endpoint ID saved in the DB do not match.

According to the configuration of claim 1 and the method of claim 8, if the received value and the expected value of the same opposite endpoint ID do not match, a wiring abnormality is determined, and therefore the operator of the transmission network can recognize that there is an abnormality in the wiring between the functional units or the service apparatuses and the functional units related to the opposite endpoint ID. In this case, the operator can check the data input setting to the functional unit related to the wiring of the abnormal location, and instructs a maintenance person who performs the wiring to check the wiring of the abnormal location so that an incorrect data input setting or an incorrect connection at an abnormal location can be identified. That is, when separate service apparatuses that provide various communication services to users are connected by a wiring with communication functional units interposed, if there is a wiring abnormality, the location of the abnormality can be easily identified.

The invention according to claim 2 is the wiring management system according to claim 1, in which, when the service network is an Internet protocol (IP) network, the functional unit receives a signal of an Ethernet frame including a sender address from the service apparatus, and in a case where the functional unit performs, when transferring the received signal to an optical channel data unit (ODU)/optical channel transport unit (OTU) frame, the synchronization processing for extracting the sender address, the service apparatus stores a media access control (MAC) address of an endpoint of the service apparatus as an endpoint ID in a slot of the sender address of the Ethernet frame, and the functional unit receives the Ethernet frame in which the MAC address is stored, the functional unit extracts the MAC address stored in the received Ethernet frame as a received value of the opposite endpoint ID and sends the value to the transmission network management apparatus.

According to this configuration, even when the service network is an IP network, the service apparatus stores the MAC address of the endpoint as an endpoint ID and stores the endpoint ID as a sender address of an Ethernet frame, and by transmitting the sender address to the functional unit of the transmission apparatus, the functional unit can receive the endpoint ID stored in the Ethernet frame as a received value of the opposite endpoint ID and transmit the frame to the transmission network management apparatus. When the received value and the expected value do not match, the wiring determination unit of the transmission network management apparatus can easily identify the location of the wiring abnormality.

The invention according to claim 3 is the wiring management system according to claim 1, in which, when the service network is an Ethernet network, the functional unit receives a signal of a link layer discovery protocol (LLDP) frame or an operations administration maintenance (OAM) frame as an Ethernet frame including a sender address from the service apparatus, and in a case where the functional unit performs, when transferring the received signal to the ODU/OTU frame, synchronization processing for extracting the sender address, the service apparatus stores a MAC address of an endpoint of the service apparatus as an endpoint ID in a slot of a sender address of the LLDP frame or the OAM frame, the functional unit receives the LLDP frame or the OAM frame in which the MAC address is stored, and the functional unit extracts the MAC address stored in the received LLDP frame or OAM frame as a received value of the opposite endpoint ID and sends the received value to the transmission network management apparatus.

According to this configuration, even when the service network is an Ethernet network, the service apparatus stores the MAC address of the endpoint as an endpoint ID in the slot of the sender address of the LLDP frame or the OAM frame, and transmits the frame to the functional unit of the transmission apparatus. Thereby, the functional unit can receive the MAC address stored in the LLDP frame or the OAM frame as the received value of the opposite endpoint ID and transmit the received value to the transmission network management apparatus. When the received value and the expected value do not match, the wiring determination unit of the transmission network management apparatus can easily identify the location of the wiring abnormality.

The invention according to claim 4 is the wiring management system according to claim 1, in which, among the plurality of functional units, a functional unit without a light emitting element is configured to receive an endpoint ID from a functional unit with a light emitting element via an optical wiring and send the endpoint ID to the transmission network management apparatus.

According to this configuration, even between functional units that do not specify that signal transmission is possible in the ITU-T standard, an endpoint ID can be received between the functional units only in one direction and sent to the transmission network management apparatus as a received value of the opposite endpoint ID. Therefore, the transmission network management apparatus can determine a wiring abnormality if the received value and the expected value of the same opposite endpoint ID do not match.

The invention according to claim 5 is the wiring management system according to claim 1, in which the plurality of functional units are connected by a two-core integrated two-core optical fiber, among the plurality of functional units, a non-equipped functional unit without a light emitting element includes a return unit configured to return and respond an endpoint ID of a equipped functional unit received from the equipped functional unit with a light emitting element to the equipped functional unit, the transmission network management apparatus includes a second DB configured to save each of the endpoint names in association with each defined endpoint ID for each endpoint corresponding to each of the endpoint names, the wiring determination unit determines that there is no incorrect connection if the endpoint IDs before and after returning at the return unit are the same, and when in accordance with a determination that there is no incorrect connection, the received value management unit saves the endpoint ID received by the non-equipped functional unit as a received value of an opposite endpoint ID in pairs with an expected value of the same opposite endpoint ID stored in the DB, searches for the endpoint ID of the non-equipped functional unit associated with the saved received value from the second DB, and saves the searched endpoint ID as a received value of an opposite endpoint ID of the endpoint of the equipped functional unit in pairs with the expected value in the DB.

According to this configuration, the actual wiring that connects both the functional units opposite to each other can be correctly connected so that there is no incorrect connection, and both endpoint names can be saved and managed in association with the expected value/received value of the opposite endpoint ID so as to be suitable for the actual wiring.

The invention according to claim 6 is the wiring management system according to claim 1, in which the wiring determination unit detects a route location where a new route set between the functional units between the service apparatuses and an existing route between the functional units do not overlap with each other and only the new route is set, and identifies the detected path location as a suspected location where an incorrect connection is suspected.

According to this configuration, a suspected location where an incorrect connection is suspected is identified, and the maintenance person may check the identified location when the incorrect connection occurs after wiring and connecting a new route. For this reason, it is possible to shorten the time required to check the incorrect connection.

The invention according to claim 7 is a wiring management system including separate service apparatuses configured to provide various communication services to user terminals via a service network, a transmission apparatus configured to connect between the service apparatuses through a transmission network with a plurality of communication functional units interposed in the transmission network, and a transmission network management apparatus configured to identify a wiring abnormality of the connected transmission network, in which the transmission network management apparatus includes a first DB configured to save endpoint names which are unique names of endpoints as transmitting/receiving ends of the plurality of functional units, opposite endpoint names of the functional units and the service apparatuses on the opposite side of endpoint names, and an opposite endpoint ID which is an opposite side of each endpoint name among unique endpoint IDs defined for each endpoint of the service apparatuses and each endpoint of the plurality of functional units and save only the endpoint names before a wiring connection between the service apparatuses via the plurality of functional units is performed, and a second DB configured to save each endpoint name in association with each defined endpoint ID for each endpoint corresponding to each of the endpoint names, and upon completing the wiring connection, the transmission network management apparatus receives an opposite endpoint ID of a corresponding side at the endpoints of the plurality of functional units, saves the received opposite endpoint ID in association with an endpoint name of the same endpoint in the first DB, searches for the endpoint name of the same endpoint as the endpoint of the saved opposite endpoint ID from the second DB, and saves the searched endpoint name in association with an opposite endpoint ID of the same endpoint in the first DB as an opposite endpoint name.

According to this configuration, the endpoint name, the opposite endpoint name, and the opposite endpoint ID of each functional unit are stored in the first DB in association with the actual wiring between service apparatuses, and therefore the endpoint name, opposite endpoint name, and opposite endpoint ID of each functional unit actually wired match the endpoint name, opposite endpoint name, and opposite endpoint ID of the functional units in the DB, and an incorrect connection can be eliminated.

Effects of the Invention

According to the present invention, it is possible to provide a wiring management system and a wiring management method capable of easily identifying an abnormal location if there is a wiring abnormality when separate service apparatuses that provide various communication services to users are wired and connected with communication functional units interposed.

BRIEF DESCRIPTION OF DRAWINGS

FIG. 10 is a diagram illustrating path connection information of an existing path and a new path.

DESCRIPTION OF EMBODIMENTS

Embodiments of the present invention will be described below with reference to the drawings.

Configuration of First Embodiment

Figure 1:
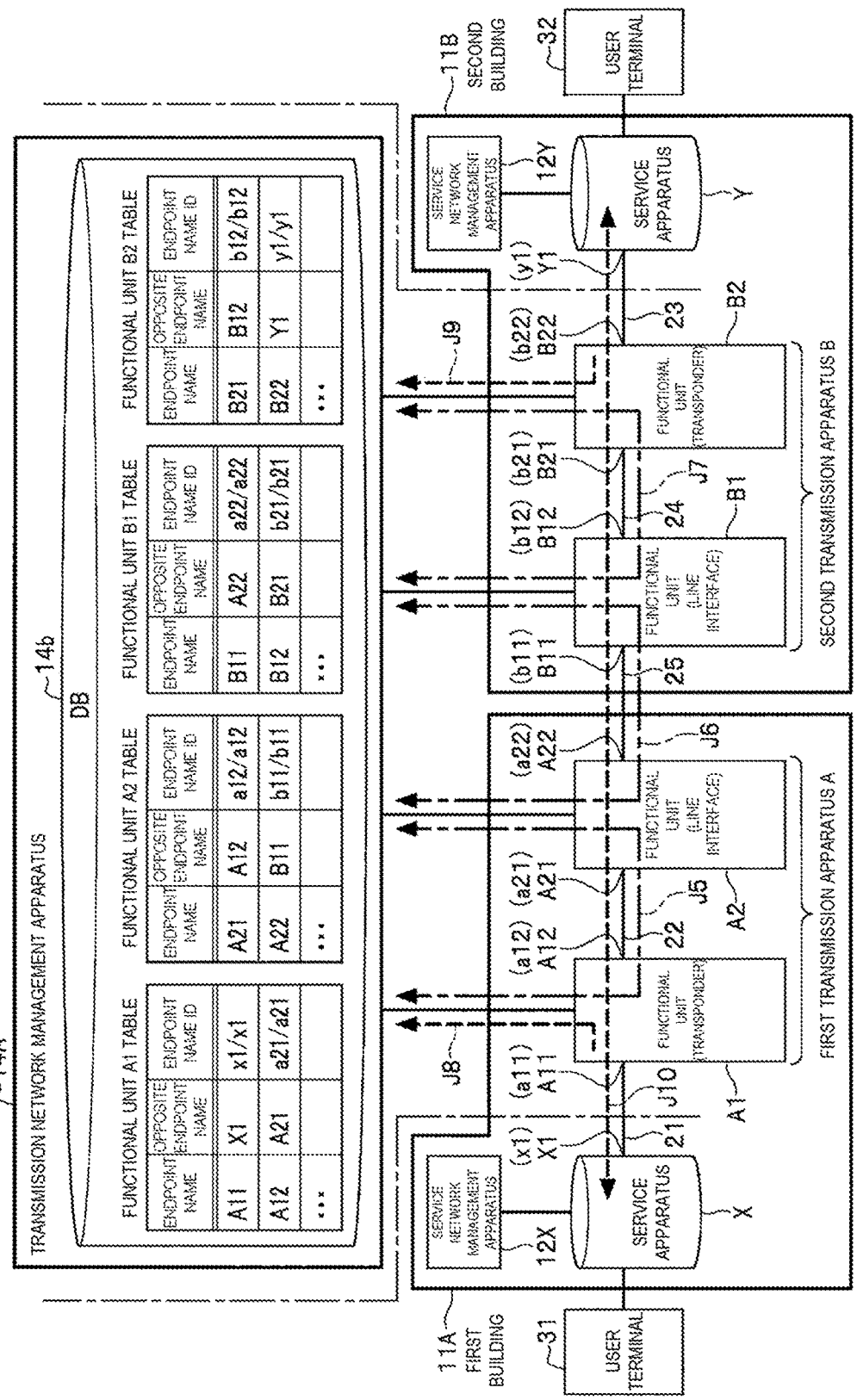
FIG. 1 is a block diagram illustrating a configuration of a wiring management system according to a first embodiment of the present invention.
Figure 12:
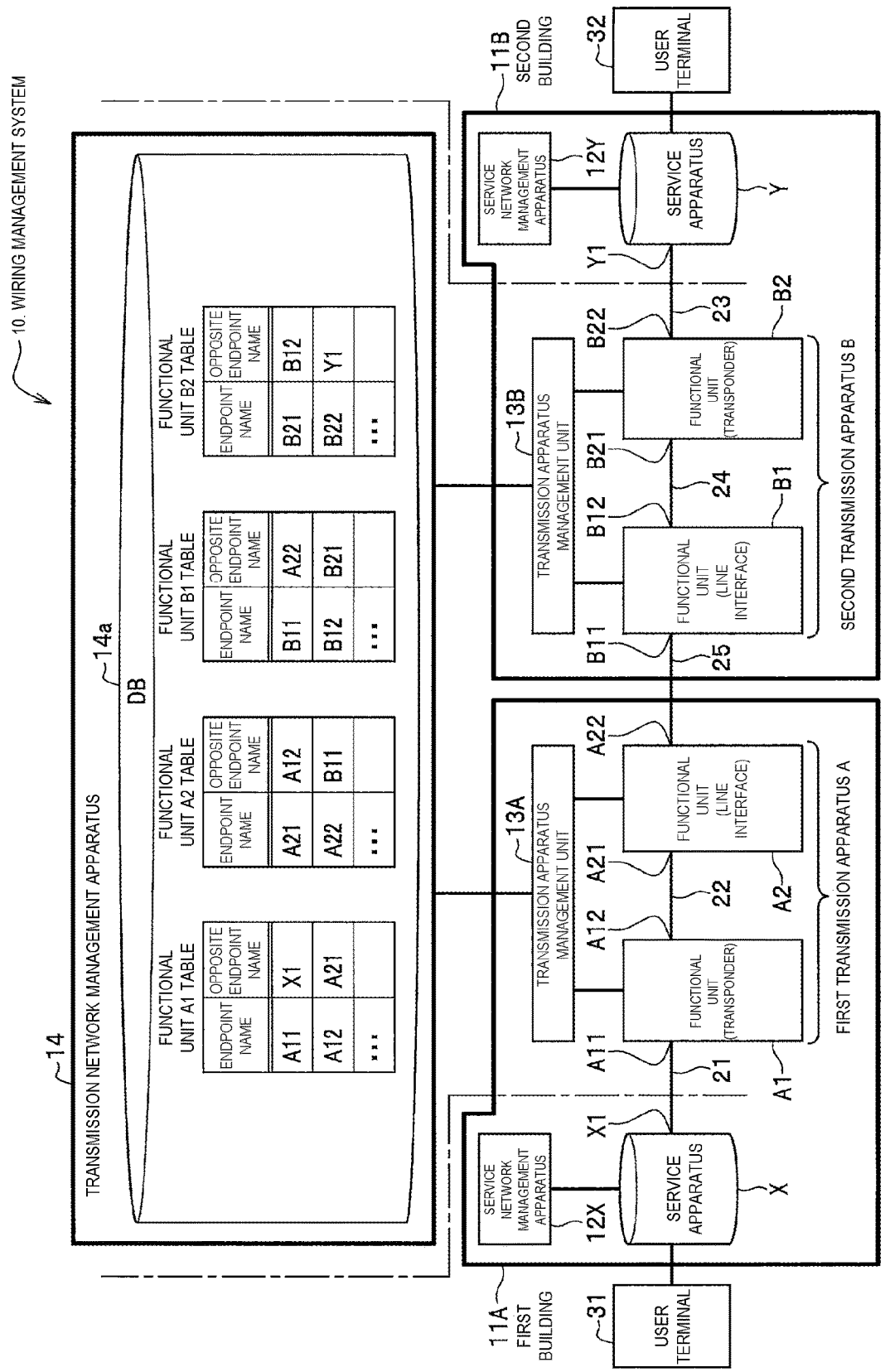
FIG. 12 is a block diagram illustrating a configuration of a wiring management system of the related art.
Figure 13:
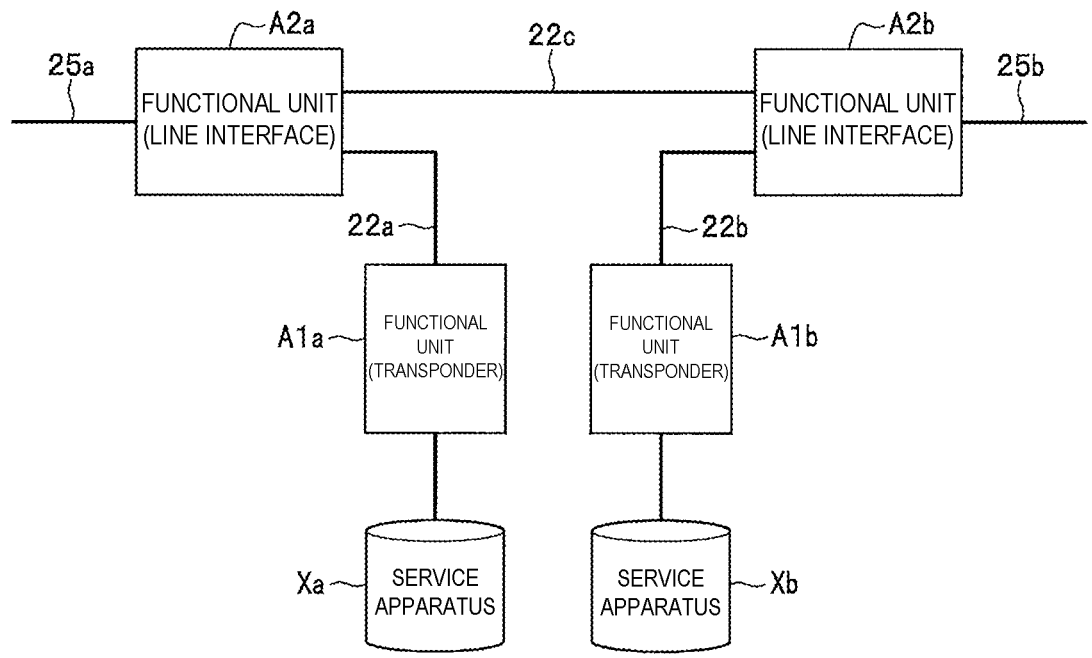
FIG. 13 is a block diagram illustrating a connection configuration of a line interface and a transponder in the wiring management system of the related art.
Figure 14:
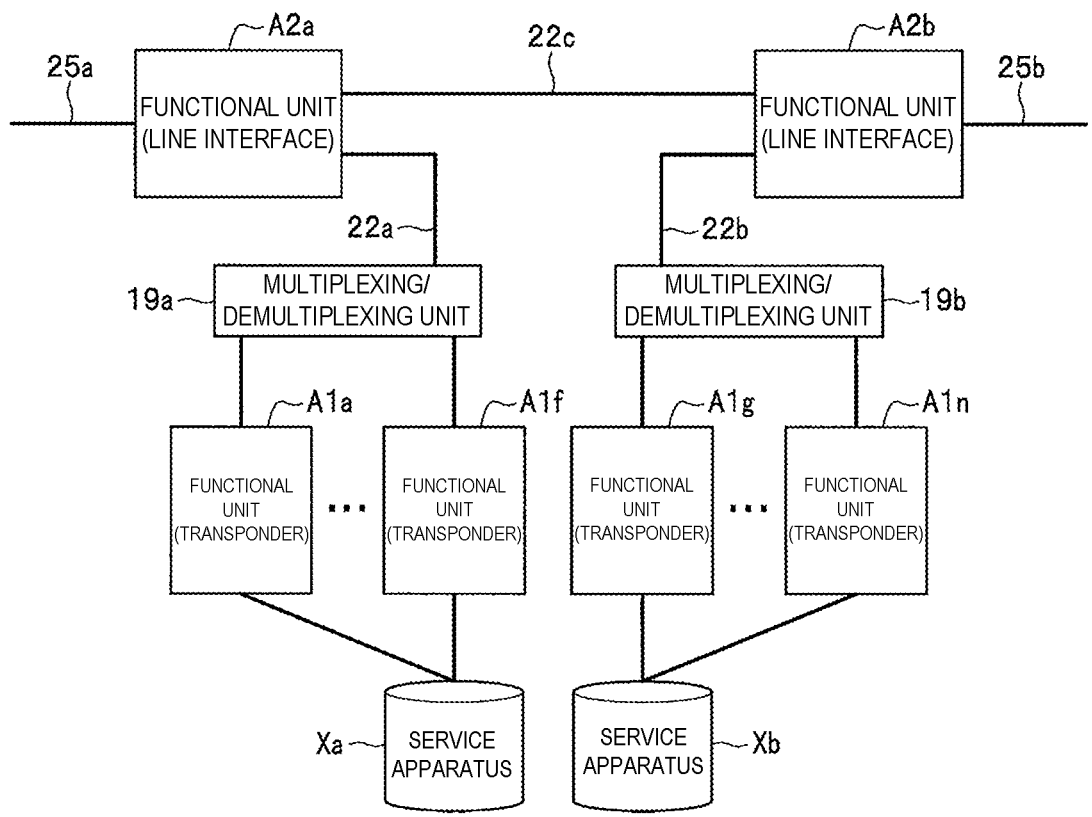
FIG. 14 is a block diagram illustrating a connection configuration of a line interface, a multiplexing/demultiplexing unit, and a transponder in the wiring management system of the related art.

FIG. 1 is a block diagram illustrating a configuration of a wiring management system according to a first embodiment of the present invention. However, in a wiring management system 10A illustrated in FIG. 1, portions corresponding to those of a wiring management system 10 of the related art, illustrated in FIG. 12 are denoted by the same reference signs, and description will be omitted as appropriate.

A wiring management system 10A illustrated in FIG. 1 includes separate service apparatuses X and Y that provide various communication services to user terminals via a service network, a first transmission apparatus A and a second transmission apparatus B, which connect between the service apparatuses X and Y through a transmission network with a plurality of communication functional units A1, A2, B1, and B2 (functional units A1 to B2) such as transponders interposed in the transmission network, and a transmission network management apparatus 14A that identifies a wiring abnormality of the connected transmission network.

The wiring management system 10A is different from the wiring management system 10 of the related art in that the transmission network management apparatus 14A stores and manages the endpoint name and the opposite endpoint name in association with an opposite endpoint identification (ID) which will be described later, as described in the DB 14b, and the location of a wiring abnormality after the wiring can be easily determined based on the opposite endpoint ID.

Figure 2:
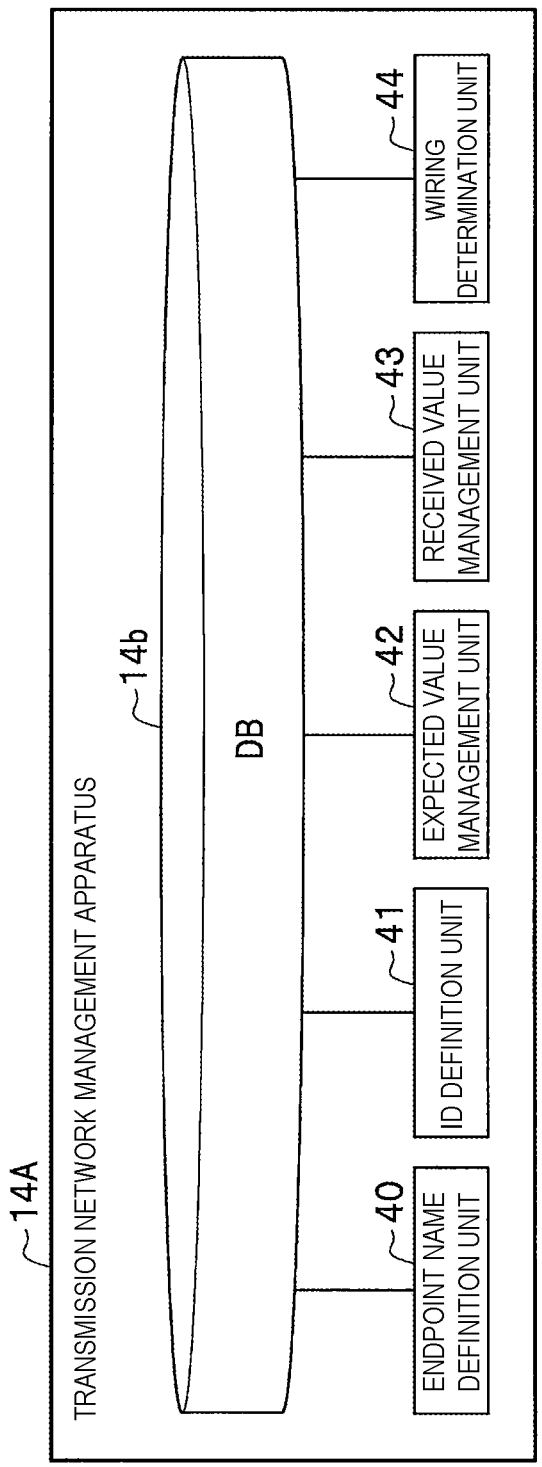
FIG. 2 is a block diagram illustrating a configuration of a transmission network management apparatus in the wiring management system according to the first embodiment.

As illustrated in FIG. 2, the transmission network management apparatus 14A includes an endpoint name definition unit 40, an ID definition unit 41, an expected value management unit 42, a received value management unit 43, and a wiring determination unit 44.

For example, as illustrated in the functional unit A1 table (FIG. 1), the endpoint name definition unit 40 defines endpoint names which are unique names of endpoints of the service apparatuses X and Y, and an endpoint name which is unique names of endpoints of each of the functional units A1 to B2 of the first transmission apparatus A and the second transmission apparatus B, and saves and manages each defined endpoint name in association with an opposite endpoint name which is the endpoint name on the opposite side of each endpoint in the DB 14b.

The ID definition unit 41 defines a unique endpoint ID for each endpoint of the service apparatuses X and Y and for each endpoint of each of the functional units A1 and B2. Although each defined endpoint ID is paired with an endpoint name, the endpoint ID may be the same as the endpoint name or may be different as follows. That is, when the endpoint ID is a name such as an identification number unique to a component constituting each of the functional units A1 to B2 and an interface address number assigned to the endpoint, and the endpoint name is a name linked to, for example, a building name or an apparatus number, endpoint ID≠endpoint name.

The expected value management unit 42 defines the opposite endpoint ID "a12" on the opposite side of the endpoint as an expected value "a12" associates the name of the endpoint (for example, "A21" illustrated in the functional unit A2 table) of each of the functional units A1 and B2 with the opposite endpoint ID "a12"' and saves the associated endpoint name "A21" and the expected value "a12" of the same endpoint in the DB 14b as a pair. One opposite endpoint ID "a12" includes an expected value "a12" and a received value "a12". The received value "a12" is obtained by receiving the opposite endpoint ID (for example, "a12") on the opposite side of the endpoint in each of the functional units A1 to B2 as the received value "a12" as described later.

As illustrated in the functional unit A2 table of the DB 14b in FIG. 1, "a12" on the front side of the opposite endpoint ID "a12/a12" is the expected value, and "a12" on the rear side is the received value. FIG. 1 illustrates a mode in which both the expected value/received value of the opposite endpoint ID are saved, but before the received value is acquired as described later, only the expected value is saved by the expected value management unit 42.

Upon receiving the wiring completion information of the facility related to the communication between the first building 11A and the second building 11B, the received value management unit 43 receives and acquires the opposite endpoint ID (for example, "a12") on the opposite side of the endpoint in each of the functional units A1 and B2 as the received value "a12" via an actual wiring, as indicated by the arrows J5, J6, and J7 in FIG. 1.

Also, as indicated by the arrows J8 and J9, the received value management unit 43 receives and acquires endpoint IDs "x1" and "y1" of the service apparatuses X and Y opposite to the functional units A1 and B2 of the transmission apparatuses A and B as received values "x1" and "y1" of the opposite endpoint IDs via the actual wiring. At this time, as illustrated by the arrow J10, the transmission apparatuses A and B transparently transmit the signal sequences output from the service apparatuses X and Y, but a partial area such as an Ethernet frame header in the signal sequence can be identified, and therefore the endpoint ID is stored in this identifiable area for transmission and reception.

Further, the received value management unit 43 saves the received value (for example, "x1") acquired as described above in a pair with the expected value "x1" of the same opposite endpoint ID in the functional unit A1 table of the DB 14b.

If the received value (rear side) and the expected value (front side) of the same opposite endpoint ID associated with the endpoint name of each of the endpoints A11 to B22 saved in the DB 14b match, the wiring determination unit 44 determines that the wiring connection between the corresponding endpoints is correct, and if not, determines that there is a wiring abnormality.

Operation of First Embodiment

Figure 15:
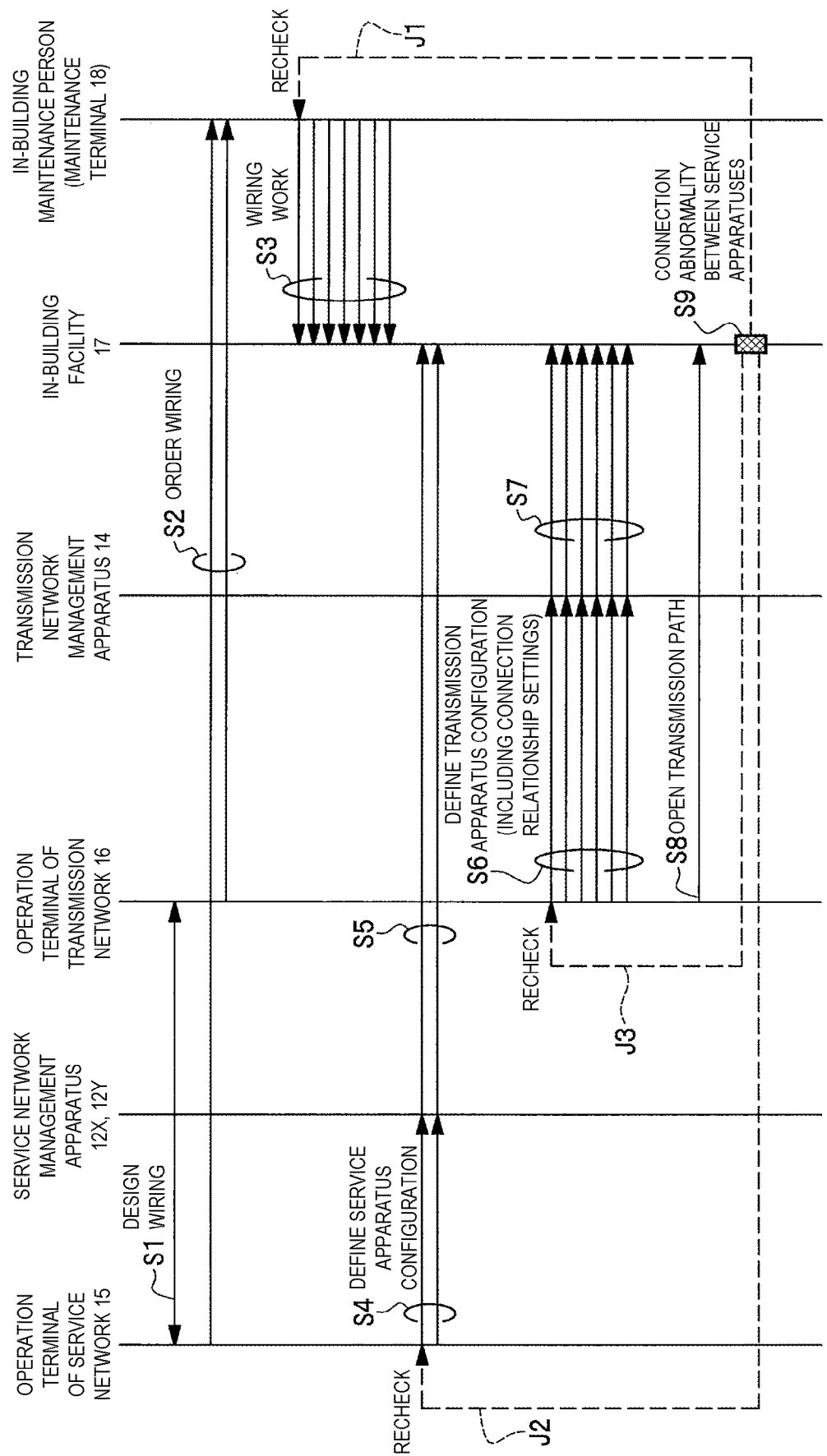
FIG. 15 is a sequence diagram illustrating a wiring abnormality determination operation in the wiring management system of the related art.

Next, an operation of determining a wiring abnormality in the wiring management system 10A according to the first embodiment will be described with reference to a sequence diagram of FIG. 3. However, in FIG. 3, the steps of the same operation as the operation illustrated in FIG. 15 are denoted by the same reference signs, and the description will be omitted as appropriate.

Figure 3:
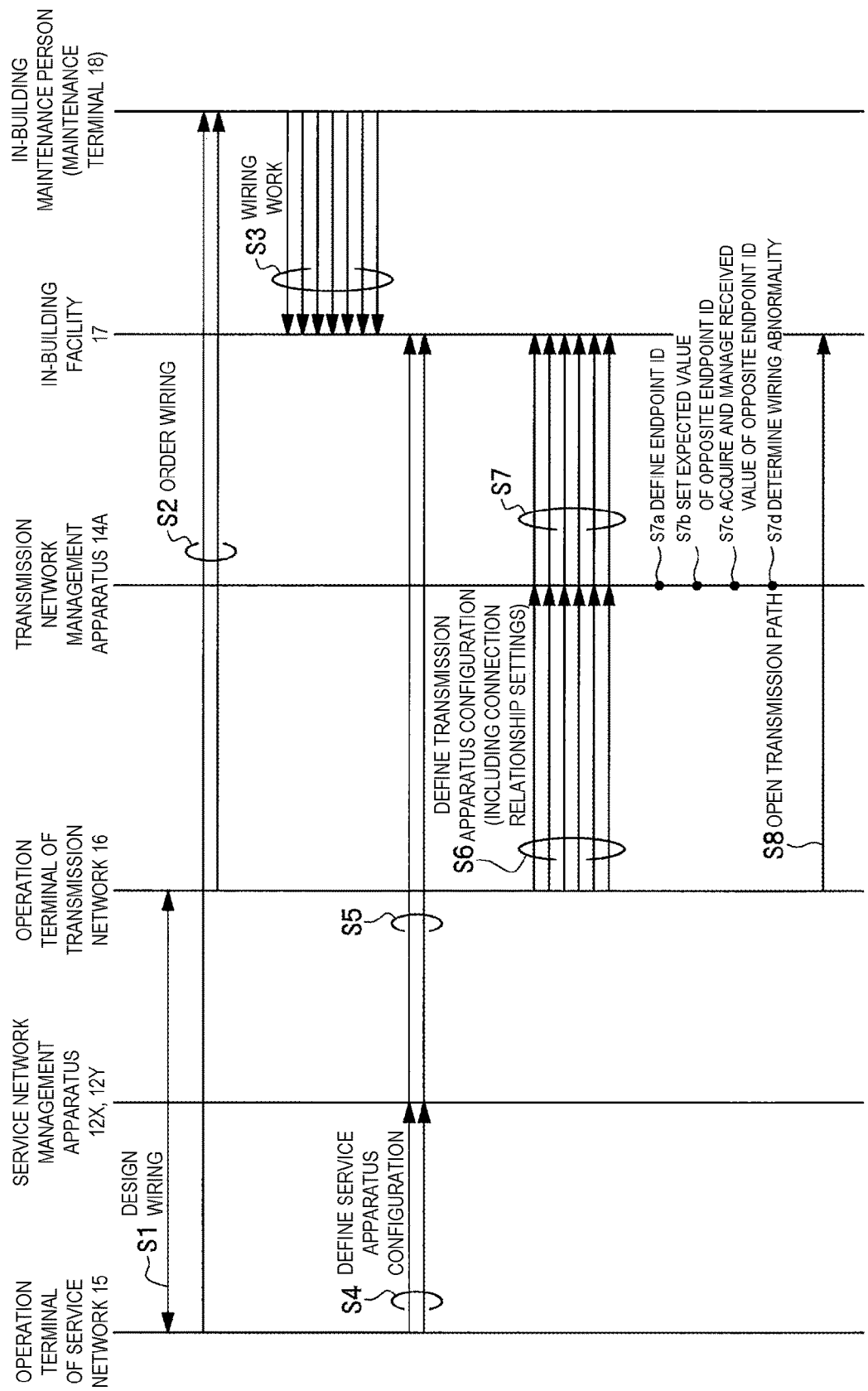
FIG. 3 is a sequence diagram illustrating a wiring abnormality determination operation in the wiring management system according to the first embodiment.

In steps S1 to S7 of FIG. 3, as described above with reference to FIG. 15, wiring design, wiring order, and wiring work are performed, and further, service apparatus configuration definition and transmission apparatus configuration definition are performed and reflected in the in-building facility 17.

However, when defining the transmission apparatus configuration in step S6, the endpoint name definition unit 40 of the transmission network management apparatus 14A defines the endpoint names of the endpoints of the service apparatuses X and Y and the endpoint names of the functional units A1 and B2 of the transmission apparatuses A and B, and saves and manages these defined endpoint names with the opposite endpoint names on the opposite side in association with each other in the DB 14b.

In step S7a of FIG. 3, the endpoint ID is defined as follows. That is, the ID definition unit 41 of the transmission network management apparatus 14A defines a unique endpoint ID for each endpoint of the service apparatuses X and Y and each endpoint of each of the functional units A1 and B2. For example, the endpoint ID of the service apparatus X illustrated in FIG. 1 is defined as "x1", and the endpoint ID of the functional unit A1 is defined as "a11" and "a12".

Next, in step S7b, the expected value of the opposite endpoint ID is set as follows. That is, the expected value management unit 42 of the transmission network management apparatus 14A defines the opposite endpoint ID on the opposite side of the endpoint as an expected value and associates the endpoint name of the endpoint of each of the functional units A1 and B2 with the opposite endpoint ID and saves the associated endpoint name and the expected value of the opposite endpoint ID in the DB 14b as a pair. At this time, a12 (received value) on the rear side of the opposite endpoint ID is not saved in FIG. 1, but only a12 (expected value) is saved.

Next, in step S7c, the received value of the opposite endpoint ID is acquired and managed as follows. That is, upon receiving the wiring completion information of the facility related to the communication between the buildings 11A and 11B illustrated in FIG. 1, the received value management unit 43 of the transmission network management apparatus 14A receives and acquires the opposite endpoint ID on the opposite side of the endpoint in each of the functional units A1 and B2 as a received value via the actual wiring, as indicated by the arrows J5, J6, and J7. Also, as indicated by the arrows J8 and J9, the received value management unit 43 receives and acquires the endpoint IDs of the service apparatuses X and Y opposite to the functional units A1 and B2 of the transmission apparatuses A and B as received values via the actual wiring.

Further, the received value management unit 43 saves the acquired received value of the opposite endpoint ID paired with the expected value of the same opposite endpoint ID in the DB 14b. For example, as illustrated in the functional unit A2 table of the DB 14b in FIG. 1, with respect to a12 (expected value) on the front side of the opposite endpoint ID associated with the endpoint name A21, the received a12 (received value) on the rear side is written and saved as a pair.

Next, in step S7d, the determination of a wiring abnormality is performed as follows. That is, the wiring determination unit 44 of the transmission network management apparatus 14A determines whether the received value of the same opposite endpoint ID associated with the endpoint name of each of the endpoints A11 to B22 saved in the DB 14b matches the expected value. As a result of the determination, if match, it is determined that the wiring connection between the corresponding endpoints is correct, and if do not match, it is determined that the wiring is abnormal.

For example, as illustrated in the functional unit A2 table of the DB 14b in FIG. 1, if match, such as a12 (expected value)/a12 (received value) of the opposite endpoint ID associated with the endpoint name A21, it is determined that the wiring connection is correct. When it is determined that the expected value/received value of the opposite endpoint ID associated with all endpoint names is correct, in step S8, the operator of the transmission network opens a transmission path connecting the service apparatuses X and Y with the operation terminal 16 and flows a signal between the service apparatuses X and Y via the transmission path.

On the other hand, if the determination result in step S7d is mismatch, it is determined that the wiring is abnormal. By this determination, the operator of the transmission network can identify an abnormality in the in-building optical wiring 22 that connects the endpoint with the endpoint name A21 of the functional unit A2 and the endpoint with the endpoint name A12 of the functional unit A1 illustrated in FIG. 1. In this case, the operator checks the data input setting to the functional units A1 and A2 related to the in-building optical wiring 22 at the abnormal location and also instructs the maintenance person to check the actual in-building optical wiring 22 at the abnormal location. As a result, an incorrect data input setting to an abnormal location or an incorrect connection is detected.

Effects of Embodiment

The effects of the wiring management by the wiring management system 10A according to the present embodiment will be described. The wiring management system 10A includes separate service apparatuses X and Y that provide various communication services to users, transmission apparatuses A and B connecting between the service apparatuses X and Y through a transmission network with a plurality of communication functional units A1 and B2 interposed in the transmission network, and a transmission network management apparatus 14A that identifies a wiring abnormality of the connected transmission network.

The transmission network management apparatus 14A, which is a feature of the present embodiment, includes a DB 14a, an endpoint name definition unit 40, an ID definition unit 41, an expected value management unit 42, a received value management unit 43, and a wiring determination unit 44.

The DB 14a stores information relating to the plurality of functional units A1 and B2.

The endpoint name definition unit 40 defines endpoint names which are unique names of endpoints as transmitting/receiving ends of the service apparatuses X and Y and endpoint names which are unique names of endpoints as transmitting/receiving ends of the plurality of functional units A1 and B2 and saves each of these defined endpoint names in association with an opposite endpoint name which is the endpoint name on the opposite side of each endpoint in the DB 14b.

The ID definition unit 41 defines a unique endpoint ID for each endpoint of the service apparatuses X and Y and for each endpoint of each of the plurality of functional units A1 and B2.

The expected value management unit 42 defines the opposite endpoint ID on the opposite side of the endpoint as an expected value and associates the endpoint name of the endpoint of a plurality of the functional units A1 and B2 with the opposite endpoint ID and saves the associated endpoint name and the expected value in the DB 14b as a pair.

Upon completing the wiring connection between the service apparatuses X and Y, the received value management unit 43 receives, as a received value, the opposite endpoint ID on the opposite side of the endpoint in the plurality of functional units A1 to B2 via a wiring and receives, as a received value, the opposite endpoint ID of the service apparatuses X and Y opposite to the predetermined functional unit A1 or B2 of the plurality of functional units A1 or B2 via a wiring.

Then, the received value management unit 43 saves these received values in a pair with the expected values of the same opposite endpoint IDs in the DB 14b.

According to this configuration, if the received value and the expected value of the same opposite endpoint ID do not match, it is determined that the wiring is abnormal, and therefore the operator of the transmission network can identify that there is an abnormality in the wiring between the functional units A1 and B2 or between the service apparatuses X and Y, or between the functional units A1 and B2 related to the opposite endpoint ID. That is, the abnormal location can be identified. In this case, the operator can check the data input setting to the functional unit related to the wiring of the abnormal location, and instructs a maintenance person who performs the wiring to check the wiring of the abnormal location so that an incorrect data input setting or an incorrect connection at an abnormal location can be confirmed. That is, if there is a wiring abnormality after the wiring, the abnormal location can be easily identified.

Application Example 1 of First Embodiment

An application example 1 of the first embodiment relates to a specific method of transmitting and receiving an endpoint ID between the service apparatuses X and Y and the transmission apparatuses A and B illustrated in FIG. 1 when the service network is an IP network.

Figure 4:
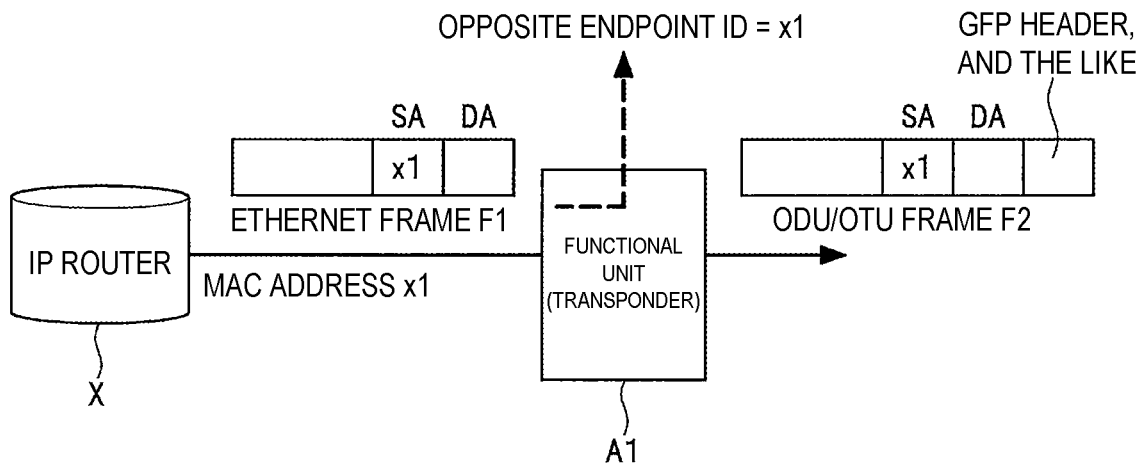
FIG. 4 is a block diagram illustrating a connection configuration between an IP router and a transponder in a wiring management system according to an application example 1 of the first embodiment.

FIG. 4 is a block diagram illustrating a connection configuration between an IP router X as a service apparatus X (FIG. 1) and a transponder A1 as a functional unit A1 (FIG. 1) in the wiring management system according to the application example 1 of the first embodiment. This connection configuration is the same for the other service apparatus Y and the functional unit B2 illustrated in FIG. 1.

The transponder A1 illustrated in FIG. 4 only transmits data from the IP router X of the IP network transparently and cannot detect the contents of the data from the IP router X.

However, the transponder A1 performs synchronization processing for extracting Ethernet header information including SA (sender address) at the end of an Ethernet frame F1 when transferring a received signal from the IP router X by the Ethernet frame F1 to an optical channel data unit (ODU)/optical channel transport unit (OTU) frame F2. For this reason, the transponder A1 can extract (receive) the SA. DA of the Ethernet frame F1 is a destination address. The ODU/OTU frame F2 has a generic framing procedure (GFP) header in addition to SA and DA.

The IP router X stores the unique media access control (MAC) address of the endpoint of the IP router X in the SA slot of the Ethernet frame F1 as an endpoint ID (for example, "x1") and transmits the endpoint ID to the transponder A1.

After receiving the Ethernet frame F1, the transponder A1 detects the MAC address "x1" stored in the SA, extracts this "x1" as a received value of the opposite endpoint ID, and sends the received value to the transmission network management apparatus 14A.

According to the application example 1, even when the service network is an IP network, the service apparatuses X and Y store the MAC address of the endpoint as an endpoint ID, store the MAC address as an SA in an Ethernet frame, and transmit the SA to the functional unit of the transmission apparatus. The functional unit that receives this transmission signal can extract the MAC address stored in the Ethernet frame as the received value of the opposite endpoint ID and send the received value to the transmission network management apparatus 14A. When the received value and the expected value do not match, the wiring determination unit 44 of the transmission network management apparatus 14A can easily identify a location with a wiring abnormality.

Application Example 2 of First Embodiment

An application example 2 of the first embodiment relates to a specific method of transmitting and receiving an endpoint ID between the service apparatuses X and Y and the transmission apparatuses A and B illustrated in FIG. 1 when the service network is an Ethernet network.

Figure 5:
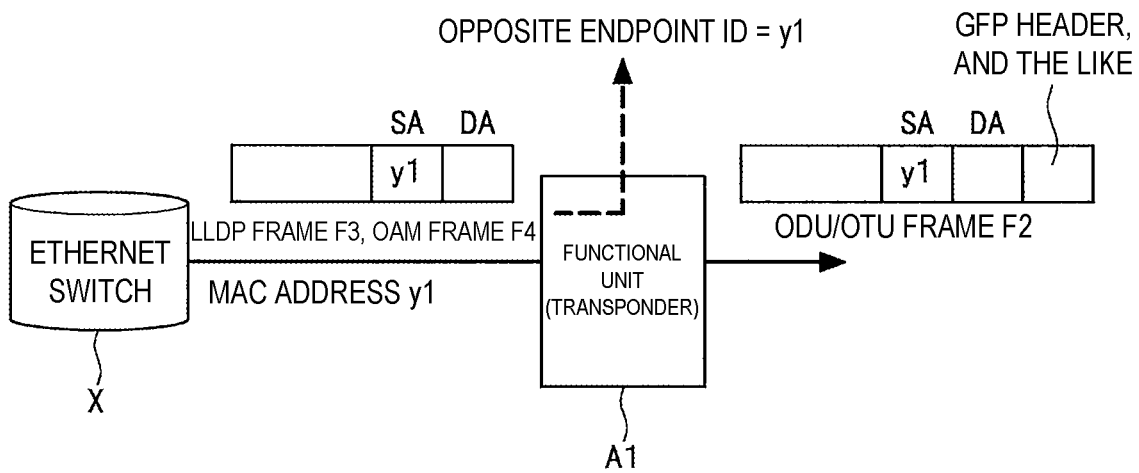
FIG. 5 is a block diagram illustrating a connection configuration between an Ethernet switch and a transponder in a wiring management system according to an application example 2 of the first embodiment.

FIG. 5 is a block diagram illustrating a connection configuration between an Ethernet switch X as a service apparatus X and a transponder A1 as a functional unit A1 in the wiring management system according to the application example 2 of the first embodiment. This connection configuration is the same for the other service apparatus Y and the functional unit B2 illustrated in FIG. 1.

The SA of the Ethernet frame output from a switch X varies, but when the switch X outputs a link layer discovery protocol (LLDP) frame F3 or operations administration maintenance (OAM) frame F4 as an Ethernet frame, the MAC address of the endpoint of the switch X is stored as an endpoint ID (for example, "y1") in the SA slot of these frames F3 and F4 and can be transmitted to the transponder A1. When the switch X outputs a frame other than the frames F3 and F4, the data in the SA cannot be guaranteed. Therefore, in the application example 2, the frames F3 and F4 are used.

After receiving the frame F3 or F4, the transponder A1 detects "y1" of the MAC address stored in the SA, extracts "y1" as a received value of the opposite endpoint ID, and sends the received value to the transmission network management apparatus 14A (FIG. 1).

According to such application example 2, even when the service network is an Ethernet network, the service apparatuses X and Y store the MAC address of the endpoint as the endpoint ID "y1" in the SA slot of the LLDP frame F3 or the OAM frame F4 and transmit the ID to the functional unit of the transmission apparatus. As a result, the functional unit can receive the MAC address "y1" stored in the Ethernet frame as a received value of the opposite endpoint ID and can send the received value to the transmission network management apparatus 14A. When the received value and the expected value do not match, the wiring determination unit 44 of the transmission network management apparatus 14A can easily identify a location with a wiring abnormality.

Application Example 3 of First Embodiment

If the provisions for exchanging signals between the functional units of the wiring management system 10 of the related art, illustrated in FIG. 12, for example, between the endpoints A12 and A21 of the functional units A1 and A2 are not described in the International Telecommunication Union Telecommunication Standardization Sector (ITU-T) standards (1) and (2) described below, an application example 3 of the first embodiment enables the exchange.

ITU-T Standard (1): ITU-T Recommendation G. 709/Y. 1331, "Interfaces for the optical transport network", 2012.

ITU-T Standard (2): ITU-T Recommendation G. 798, "Characteristics of optical transport network hierarchy equipment functional blocks", 2012.

Figure 6:
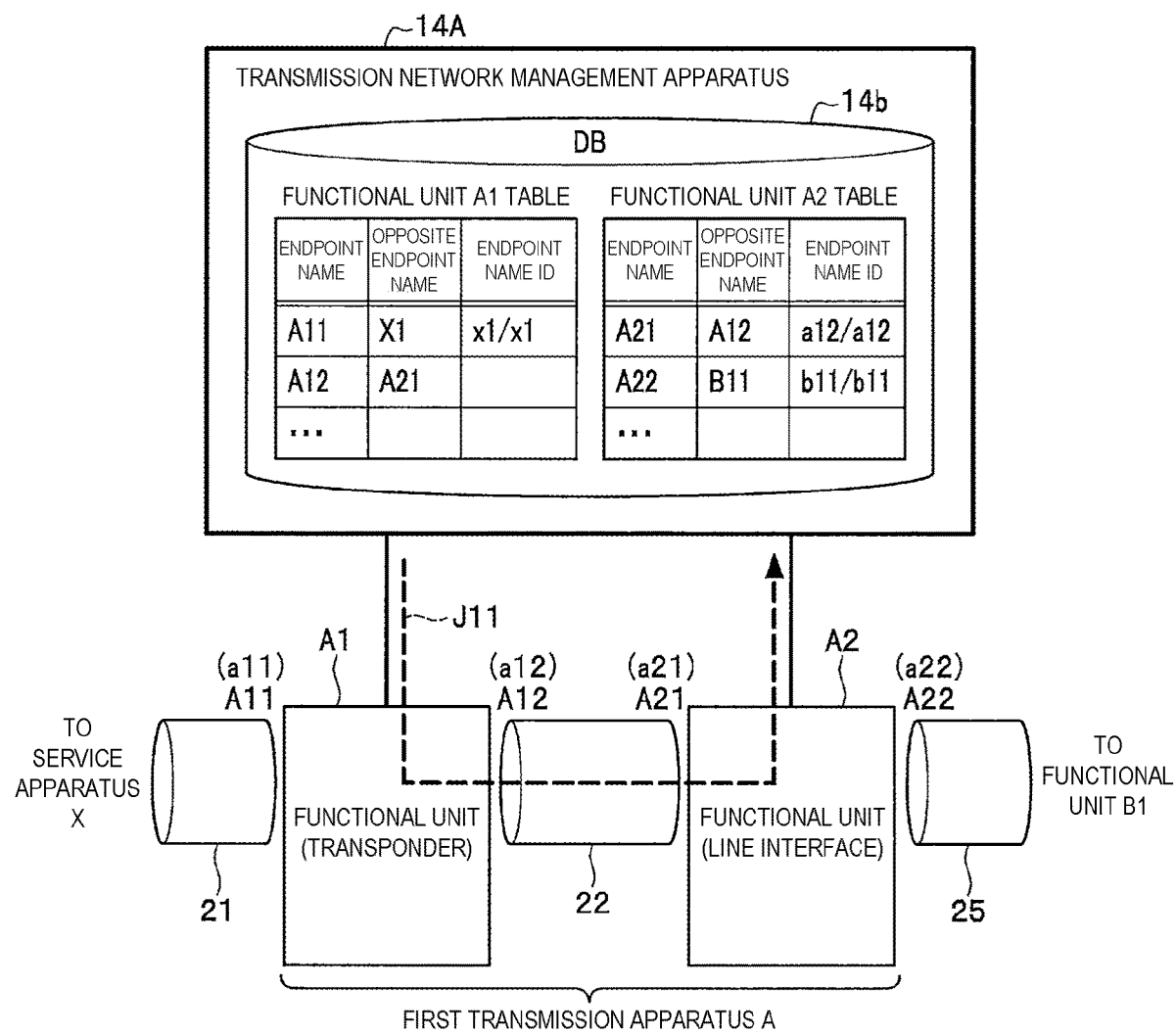
FIG. 6 is a block diagram illustrating a partial configuration of a wiring management system according to an application example 3 of the first embodiment.

FIG. 6 is a block diagram illustrating a partial configuration of a wiring management system according to an application example 3 of the first embodiment.

Here, in order to determine an incorrect connection of the internal link connecting the functional units, it is necessary to exchange the endpoint ID via the actual wiring 22 of the internal link connecting the functional units A1 and A2 illustrated in FIG. 6. The line interface A2 can accommodate several tens of wavelength paths by deploying one for each inter-building optical transmission line 25. However, because the number of transponders A1 needs to be provided according to the number of wavelength paths terminated in the building 11A (FIG. 1), both the number and the frequency of expansion are very large.

Therefore, a technique of transmitting and receiving a monitoring signal on an internal link whose endpoint is a functional unit including a light emitting element such as a transponder is applied. This technique includes the following. That is, there are a method for deploying a monitoring channel of a different wavelength from a wavelength path signal sequence, a method for transmitting and receiving a test signal before opening and providing a wavelength path to the service network, a method of applying intensity and frequency modulation to a wavelength path signal sequence and detecting a signal on the receiving side based on the time series pattern of the modulated signal and the presence or absence of frequency components, and the like.

In the first transmission apparatus A of the application example 3 illustrated in FIG. 6, because only the transponder A1 includes a light emitting element, as indicated by the dashed arrow J11, only in one direction from the transponder A1 to the line interface A2 via the in-building optical wiring 22, the endpoint ID can be transmitted and received by the line interface A2. The transponder A1 constitutes a equipped functional unit described in claims. The line interface A2 constitutes a non-equipped functional unit described in the claims.

For example, the line interface A2 receives the endpoint ID (for example, "a12") of the transponder A1 transmitted from the transponder A1 and transmits the received endpoint ID as a received value of the opposite endpoint ID to the transmission network management apparatus 14A.

The received value management unit 43 (FIG. 2) of the transmission network management apparatus 14A saves the received value in a pair with the expected value of the corresponding opposite endpoint ID in the DB 14b. If the received value and the expected value do not match, the wiring determination unit 44 determines that there is a wiring abnormality.

Application Example 4 of First Embodiment

Figure 7:
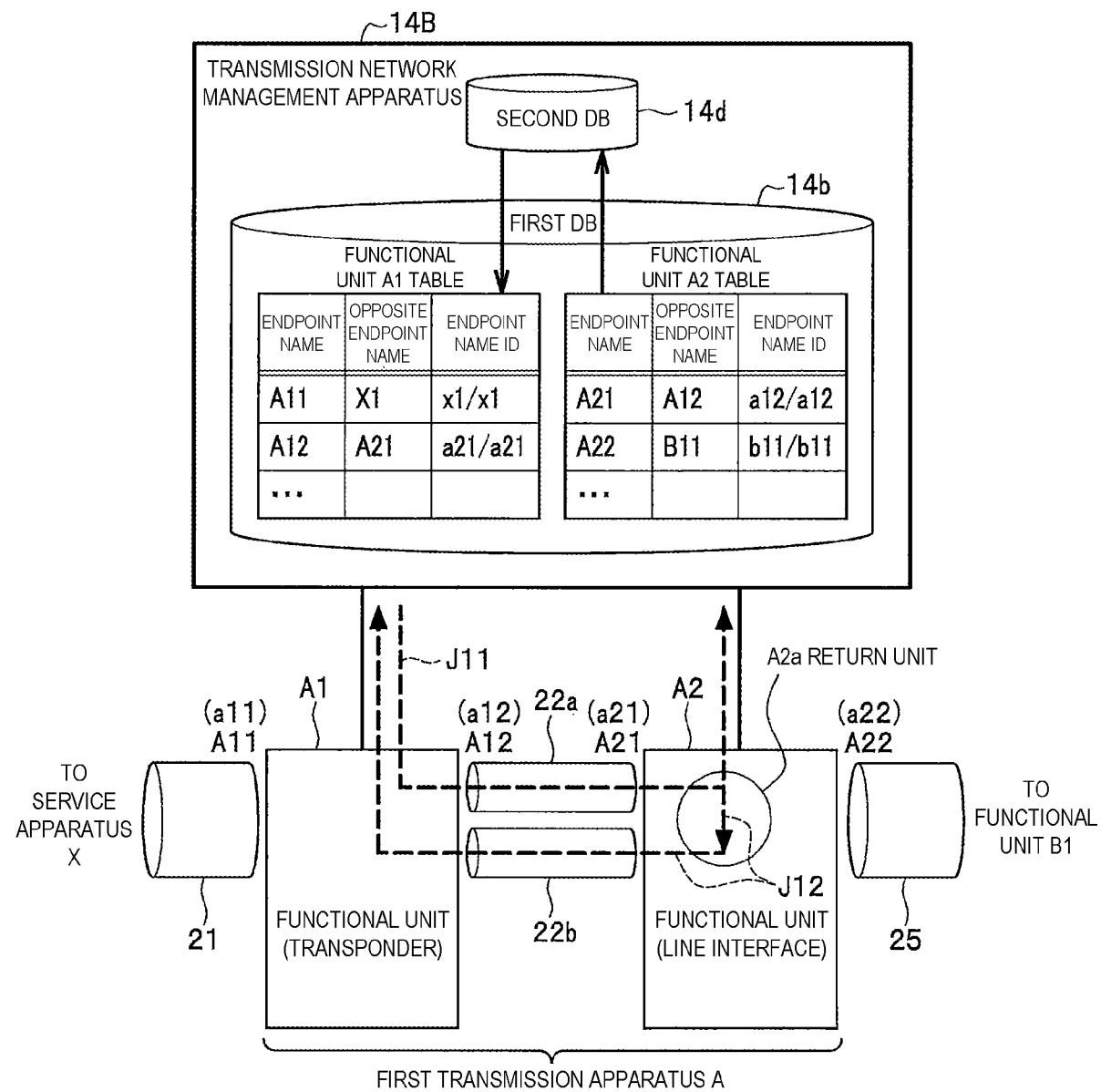
FIG. 7 is a block diagram illustrating a partial configuration of a wiring management system according to an application example 4 of the first embodiment.

FIG. 7 is a block diagram illustrating a partial configuration of a wiring management system according to an application example 4 of the first embodiment. However, in the configuration of the application example 4 of FIG. 7, the same parts as those of the configuration of the application example 3 illustrated in FIG. 6 are denoted by the same reference signs, and the description will be omitted as appropriate.

The configuration of application example 4 illustrated in FIG. 7 is different from the configuration of application example 3 in that the transponder A1 and the line interface A2 are connected by two-core integrated optical fibers (two-core optical fibers) 22a and 22b, and the line interface A2 is provided with an optical signal return unit A2a. Further, the transmission network management apparatus 14B includes a first DB 14b and a second DB 14d, which are the same as the DB 14b in FIG. 1.

As indicated by the arrow J12, the return unit A2a returns the optical signal transmitted from the transponder A1 through the one optical fiber 22a at the return unit A2a, as indicated by the arrow J11, and transmits the signal to the other optical fiber 22b and sends the signal back to the transponder A1.

The second DB 14d saves the endpoint names and the endpoint IDs of all the functional units A1 and B2 (see FIG. 1) and manages the endpoint names and the endpoint IDs in a unified manner. That is, the transmission network management apparatus 14B saves each of the endpoint names of the endpoints of the service apparatuses X and Y and the endpoint names of the endpoints of the functional units A1 and B2 of the first transmission apparatus A and the second transmission apparatus B in association with opposite endpoint name on the opposite side of each endpoint name in the second DB 14d.

Because the two-core optical fibers 22a and 22b are integrated optical fibers, in the connection between two points, if the up direction is correctly connected, the down direction cannot be incorrectly connected.

Therefore, the line interface A1 receives the endpoint ID "a12" from the transponder A1 as the received value "a12" of the opposite endpoint ID. The received endpoint ID "a12" is returned at the return unit A2a and received by the transponder A1. The wiring determination unit 44 (FIG. 2) of the transmission network management apparatus 14B determines that there is no incorrect connection if the endpoint ID "a12" transmitted and returned by the two-core optical fibers 22a and 22b is the same.

After determining that there is no incorrect connection, the received value management unit 43 (FIG. 1) of the transmission network management apparatus 14B saves the received value "a12" in the functional unit A2 table of the first DB 14b in pairs with the expected value "a12". Next, the received value management unit 43 searches the second DB 14d for the opposite endpoint ID "a21" corresponding to the endpoint name A21 of the line interface A2 associated with the saved received value "a12". Next, the received value management unit 43 saves the retrieved opposite endpoint ID "a21" as the received value "a21" of the opposite endpoint ID of the endpoint A12 of the transponder A1 in the functional unit A1 table of the first DB 14b.

In this manner, the actual wiring that connects both the transponder A1 and the line interface A2 opposite to each other can be correctly connected so that there is no incorrect connection, and both endpoint names can be managed in association with the expected value/received value of the opposite endpoint ID so as to be suitable for the actual wiring.

Application Example 5 of First Embodiment

Figure 8:
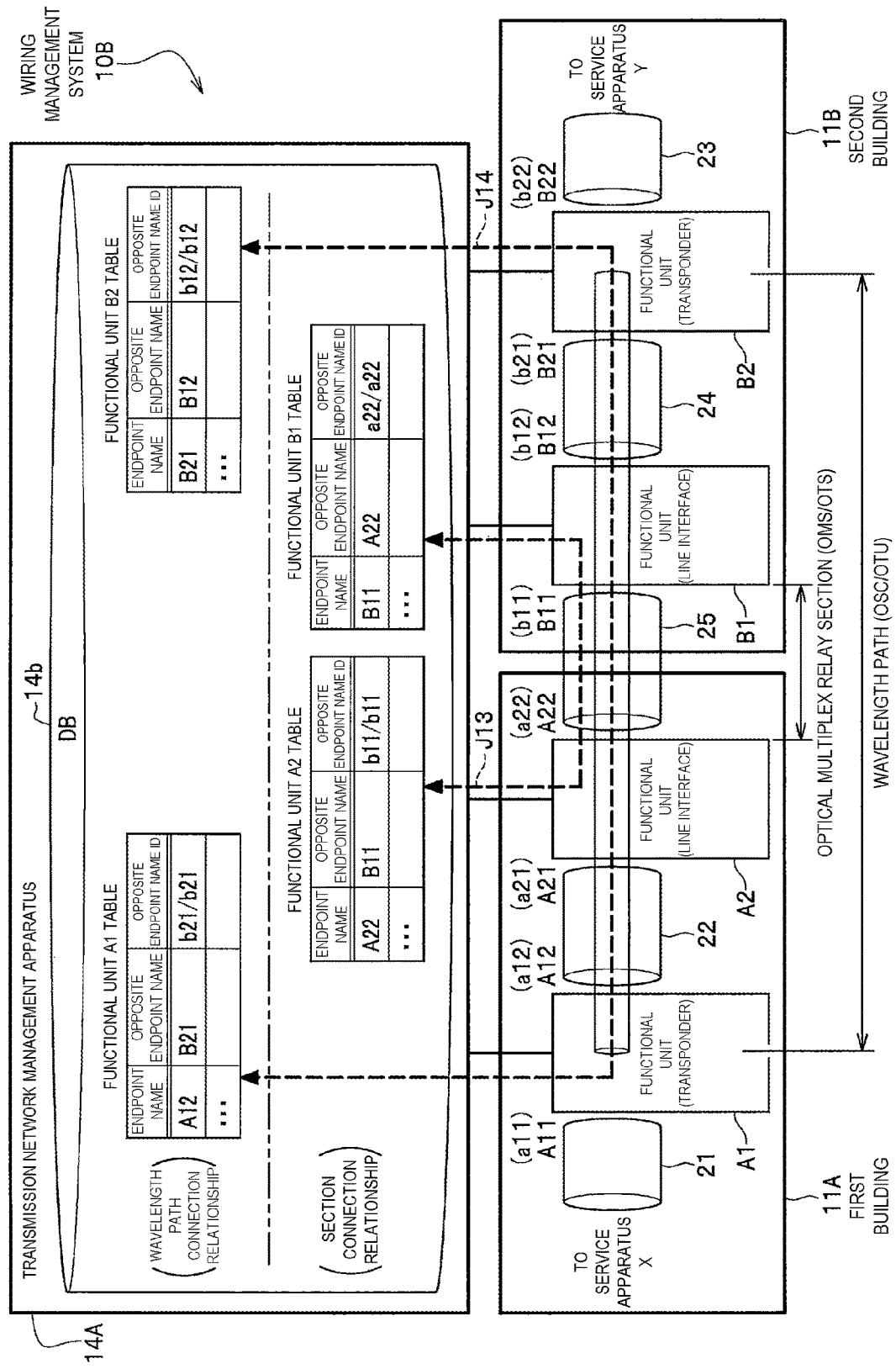
FIG. 8 is a block diagram illustrating a configuration of a wiring management system conforming to a predetermined ITU-T standard.

FIG. 8 is a block diagram illustrating a configuration of a wiring management system 10B conforming to the above-described ITU-T standards (1) and (2).

If the provisions for exchanging signals between the functional units in the same building 11A (or 11B) of the wiring management system 10B illustrated in FIG. 8, for example, between the endpoints A12 and A21 of the functional units A1 and A2 conform to the contents not described in the ITU-T standards (1) and (2), the application example 5 makes it possible to narrow down and identify incorrectly connected locations of the actual wiring in each of the functional units A1 and B2.

In existing WDM transmission systems, the inter-building optical transmission line 25 illustrated in FIG. 8 is operated and managed as an optical multiplex section (OMS) and an optical transmission section (OTS), and is operated and managed as an OTU between endpoints of the functional units A1 and B2 of a wavelength path to be set.

Further, an optical supervisory channel (OSC) is defined in the OMS/OTS section, and a dedicated overhead area is defined on the OTU and on the ODU frame defined in the upper layer of the OTU. As a result, it is possible to exchange the opposite endpoint IDs by using the OMS, the OTS, the OSC, and the OTU.

By exchanging the opposite endpoint IDs, at least between the buildings 11A and 11B as illustrated in FIG. 8, it is possible to detect the presence or absence of an incorrect connection between the line interfaces A2 and B1 indicated by the arrow J13 and an incorrect connection between the endpoints between the transponders A1 and B2 indicated by the arrow J14. However, an incorrect connection of the internal links connecting the functional units A1 and B2 in the transmission apparatuses A and B cannot be detected.

Therefore, in the application example 5, the suspected location is narrowed down based on the matching state of the opposite endpoint ID between the endpoints of the optical multiplex relay section and the wavelength path, and the accommodation information of the existing wavelength path. An example of this narrowing will be described with reference to FIGS. 9 and 10.

Figure 9:
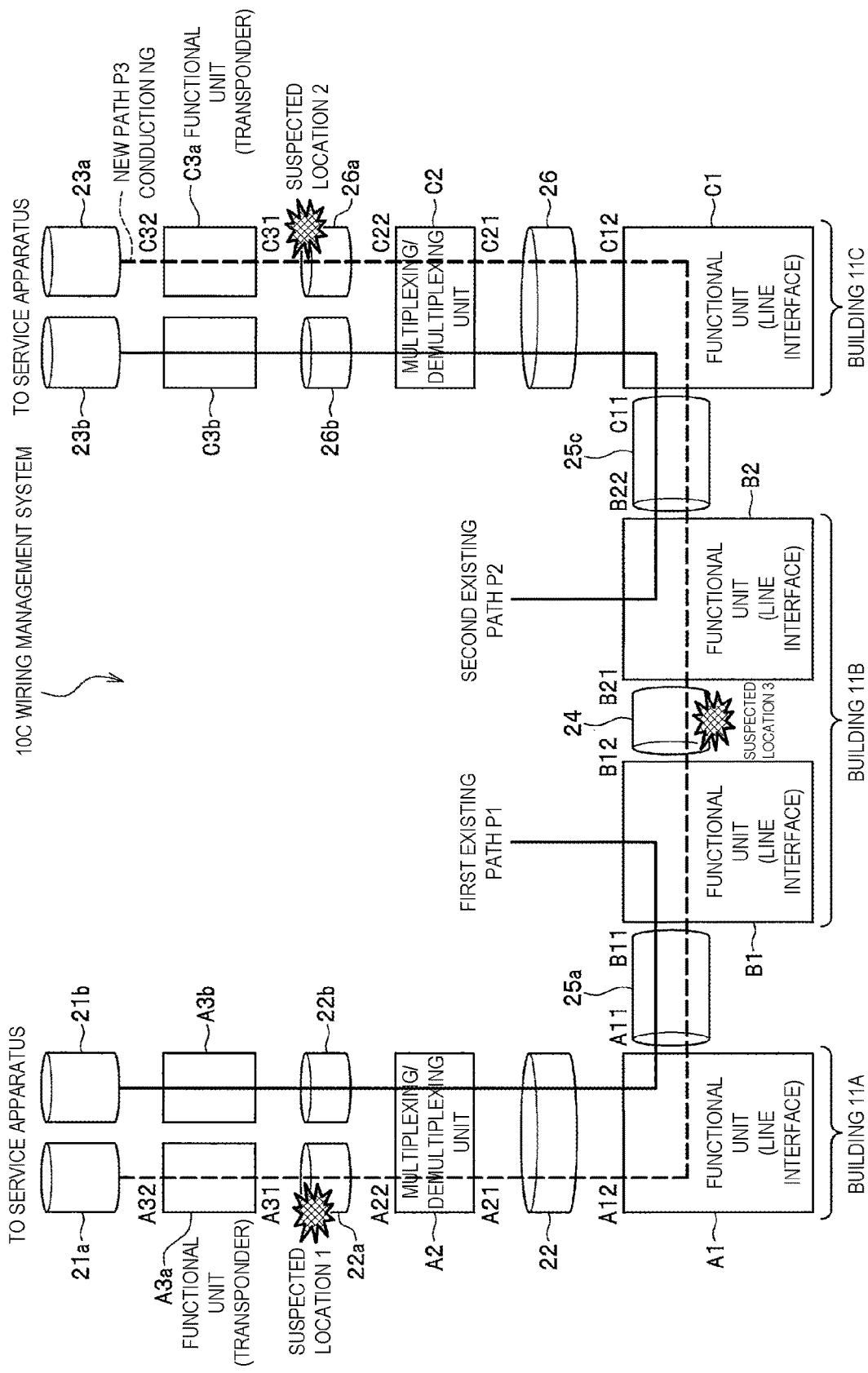
FIG. 9 is a block diagram illustrating a configuration of a wiring management system of an application example 5 of the first embodiment.

FIG. 9 is a block diagram illustrating a configuration of a wiring management system 10C of an application example 5 of the first embodiment. FIG. 10 is a diagram illustrating suspected actual wirings 1 to 3 in the wiring management system 10C of the application example 5 of the first embodiment.

In the wiring management system 10C illustrated in FIG. 9, each functional unit A1, A2, A3a, and A3b is provided in the building 11A, each functional unit B1 and B2 is provided in the building 11B, and each functional unit C1, C2, C3a, and C3b is provided in a building 11C. However, it is assumed that the functional units A1, B1, B2, and C1 are line interfaces, the functional units A2 and C2 are multiplexing/demultiplexing units, and the functional units A3a, A3b, C3a, and C3b are transponders.

In the wiring management system 10C, a first existing path P1 is connected the service apparatus via the line interface B1, an inter-building optical transmission line 25a, the line interface A1, the in-building optical wiring 22, the multiplexing/demultiplexing unit A2, the in-building optical wiring 22b, the transponder A3b, and the in-building optical wiring 21b.

Also, a second existing path P2 is connected to the service apparatus via a line interface B2, an inter-building optical transmission line 25c, a line interface C1, an in-building optical wiring 26, a multiplexing/demultiplexing unit C2, an in-building optical wiring 26b, a transponder C3b, and an in-building optical wiring 23b. In addition, the line interfaces B1 and B2 are connected by an in-building optical wiring 24. Each of the existing paths P1 and P2 constitutes an existing route described in the claims.

In the wiring management system 10C having such a connection configuration, a new path P3 is newly provided between the service apparatuses as follows. That is, the new path P3 is connected to the other service apparatus via the in-building optical wiring 23a, via the transponder A3a from one service apparatus via the in-building optical wiring 21a, the multiplexing/demultiplexing unit A2 via the in-building optical wiring 22a, the line interfaces A1, B1, B2, and C1, the multiplexing/demultiplexing unit C2 via the in-building optical wiring 26, and the transponder C3a via the in-building optical wiring 26a. The new path P3 constitutes a new route described in the claims.

The connection information of the new path P3 is saved and managed by the transmission network management apparatus 14A (FIG. 1). As illustrated in FIG. 10, in the transmission network management apparatus 14A, connection information (path connection information) PD of the existing paths P1 and P2 and the new path P3 is saved and managed in a DB. This management will be described.

Because the first existing path P1 passes through the functional units B1, A1, A2, and A3b illustrated in FIG. 9, as illustrated in FIG. 10, the first existing path P1 is managed as follows, with the state where the functional units are connected by the first existing path P1 represented by P. The first existing path P1 does not pass through the functional unit A3a.

The column of P1 illustrated in FIG. 10 is managed by adding P to the setting location of the first existing path P1. That is, P is added between the endpoint name "A11" and the opposite endpoint name "B11", P between "A12" and "A21", P between "A21" and "A12", and P between "B11" and "A11" to manage the setting location of the first existing path P1.

Similarly, because the second existing path P2 passes through the functional units B2, C1, C2, and C3b illustrated in FIG. 9, as illustrated in FIG. 10, in the column of P2, P is added between "B22" of the endpoint name and "C11" of the opposite endpoint name, P between "C11" and "B22", P between "C12" and "C21", and P between "C21" and "C12" to be managed. The second existing path P2 does not pass through the functional unit C3a.

In addition, because one endpoint of the functional unit A1 and the opposite endpoint (endpoint of the functional unit B1) are connected between different buildings 11A and 11B by the inter-building optical transmission line 25a, the state of the endpoint name "A11" and the opposite endpoint name "B11" of the functional unit A1 illustrated in FIG. 10 are managed with P/P added. That is, P/P indicates the state of connection between buildings.

Because the other endpoint of the functional unit A1 and the opposite endpoint (endpoint of the functional unit A2) are connected by the in-building optical wiring 22 in the same building 11A, the state of the endpoint name "A12" and the opposite endpoint name "A21" of the functional unit A1 illustrated in FIG. 10 is managed with N/P added. That is, N/P indicates the connection state in the building.

Similarly, the column of "state" in FIG. 10 is managed with P/P or N/P.

Because the newly established path P3 is currently being set, all the paths are being processed as illustrated in the column of P3.

Under such management, the wiring determination unit 44 (FIG. 2) of the transmission network management apparatus 14A detects a route where the setting route of the new path P3 and the setting route of the existing path P1 or P2 do not overlap with each other and only the new path P3 is set, and regards the detected route as a suspected location where an incorrect connection is suspected. In other words, a location where the setting route of the existing path P1 or P2 does not pass among the setting routes of the new path P3 is set as a suspected location.

In the example illustrated in FIG. 9, the in-building optical wiring 22a between the multiplexing/demultiplexing unit A2 and the transponder A3a in the building 11A is a first suspected location (suspected location 1), the in-building optical wiring 26a between the multiplexing/demultiplexing unit C2 and the transponder C3a in the building 11C is a second suspected location (suspected location 2), and the in-building optical wiring 24 between the line interfaces B1 and B2 in the building 11B is a third suspected location (suspected location 3). The suspected locations 1, 2, and 3, as illustrated in FIG. 10, are managed in the path connection information PD as follows. That is, between the functional units A2 and A3a is managed as the suspected location 1, between the functional units C2 and C3a is managed as the suspected location 2, and between the functional units B1 and B2 is managed as the suspected location 3.

In this manner, because the location where an incorrect connection is suspected is identified and narrowed down to the suspected locations 1 to 3, the maintenance person only has to check the identified location when an incorrect connection occurs after wiring and connecting the new path P3, thereby reducing the checking time.

Configuration of Second Embodiment

Figure 11:
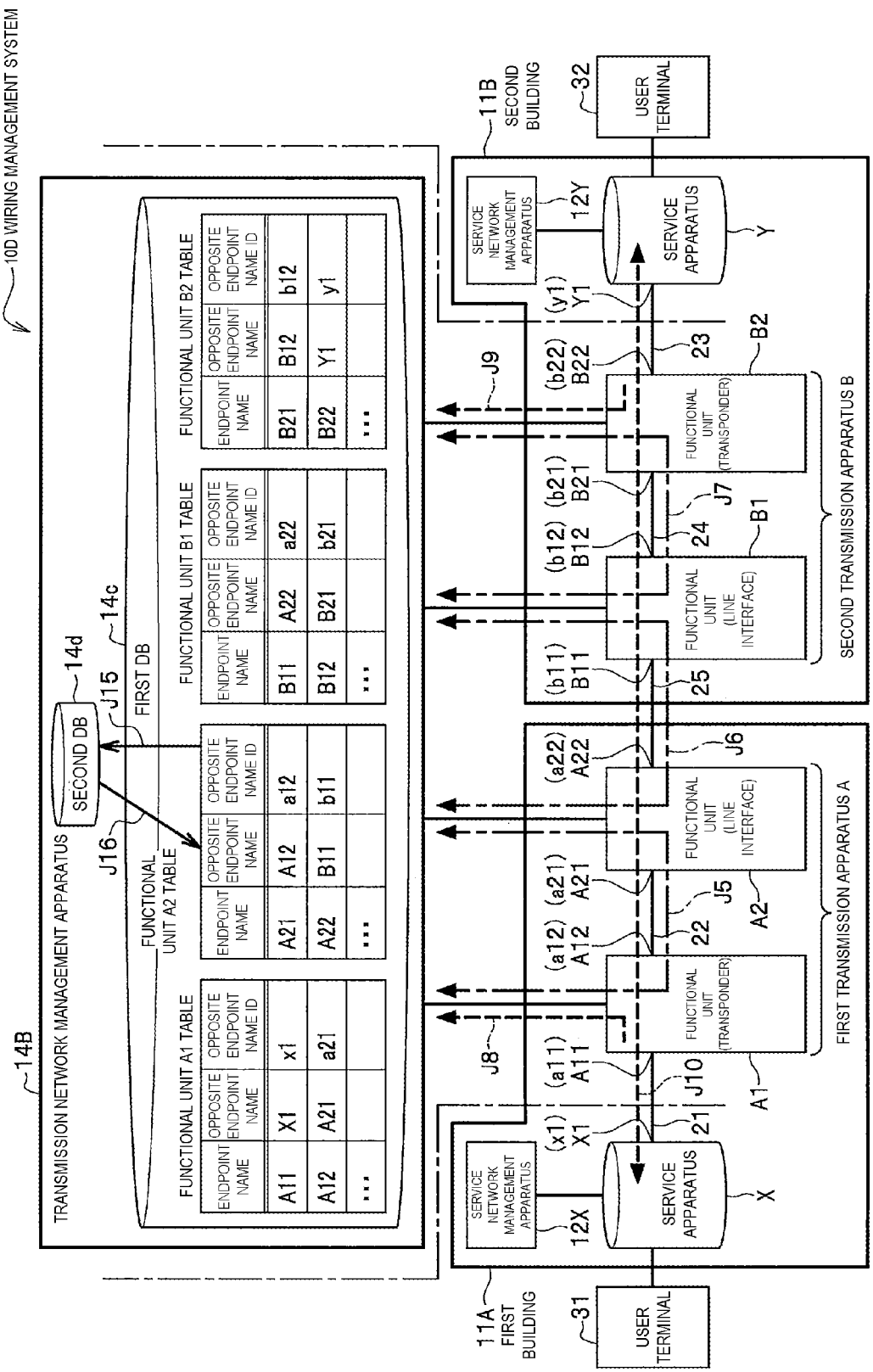
FIG. 11 is a block diagram illustrating a configuration of a wiring management system according to a second embodiment of the present invention.

FIG. 11 is a block diagram illustrating a configuration of a wiring management system according to a second embodiment of the present invention. However, in the wiring management system 10D illustrated in FIG. 11, parts corresponding to the wiring management system 10A of the first embodiment illustrated in FIG. 1 are denoted by the same reference signs, and description will be omitted as appropriate.

The wiring management system 10D illustrated in FIG. 11 is different from the wiring management system 10A in that the transmission network management apparatus 14B includes a first DB 14c and a second DB 14d and when the service apparatuses X and Y are wired and connected via the transmission apparatuses A and B, saves an endpoint name, an opposite endpoint name, and an opposite endpoint ID in association with each other in the first DB 14c based on this wiring.

The first DB 14c stores a functional unit A1 table, a functional unit A2 table, a functional unit B1 table, and a functional unit B2 table, and each table stores an endpoint name, an opposite endpoint name, and an opposite endpoint ID in association with each other. In the first DB 14c of FIG. 11, numerical values of an example of the endpoint name, the opposite endpoint name, and the opposite endpoint ID are described. However, before the service apparatuses X and Y are wired and connected via the respective functional units A1 and B2, only the endpoint names of the respective functional units A1 and B2 are stored in the respective tables of the first DB 14c, and the opposite endpoint names and the opposite endpoint IDs are not stored. When storing the opposite endpoint IDs, only one unique opposite endpoint ID is stored as illustrated.

The transmission network management apparatus 14B saves endpoint names which are unique names of endpoints of the service apparatuses X and Y and endpoint names which are unique names of endpoints of each of the functional units A1 to B2 of the first transmission apparatus A and the second transmission apparatus B in the endpoint name column, respectively in each table of the first DB 14*c*.

The second DB 14*d* saves the endpoint names and the endpoint IDs of all the functional units A1 and B2 and manages the endpoint names and the endpoint IDs in a unified manner. That is, the transmission network management apparatus 14B saves endpoint names which are unique names of endpoints of the service apparatuses X and Y, and endpoint names which are unique names of endpoints of each of the functional units A1 to B2 of the first transmission apparatus A and the second transmission apparatus B, respectively in association with an opposite endpoint name which is the endpoint name on the opposite side of each endpoint name in the second DB 14*d*.

Further, after the service apparatuses X and Y are wired and connected via the respective functional units A1 and B2, the transmission network management apparatus 14B receives the opposite endpoint ID (for example, "a12") on the corresponding side of the endpoints of the respective functional units A1 and B2. Next, the transmission network management apparatus 14B saves the received opposite endpoint ID "a12" in the opposite endpoint ID column of, for example, the functional unit A2 table associated with the endpoint name of the same endpoint in the first DB 14*c*. After saving, the transmission network management apparatus 14B accesses the second DB 14*d* as indicated by the arrow J15 and searches for an endpoint name (for example, "A12") corresponding to the opposite endpoint ID "a12" saved in the first DB 14*c*. Further, the transmission network management apparatus 14B saves the searched endpoint name "A12" in the opposite endpoint name column corresponding to the opposite endpoint ID "a12" of the first DB 14*c* as indicated by the arrow J16. In this manner, the endpoint name, the opposite endpoint name, and the opposite endpoint ID are saved in the first DB 14*c* in association with the actual wiring.

Effect of Second Embodiment

In this manner, an endpoint name, an opposite endpoint name, and an opposite endpoint ID are stored in the first DB 14*c* in association with an actual wiring, and therefore the endpoint name, opposite endpoint name, and opposite endpoint ID of each functional unit actually wired match the endpoint name, opposite endpoint name, and opposite endpoint ID of the functional units in the DB 14*b*, and an incorrect connection can be eliminated.

In addition, a specific configuration can be changed as appropriate without departing from the spirit of the present invention.

REFERENCE SIGNS LIST

10A, 10B, 10C, 10D Wiring management system
X, Y Service apparatus
A1, A2, A3*a*, A3*b*, B1, B2, C1, C2, C3*a*, C3*b* Functional unit
14*b* DB (first DB)
14*c* First DB
14*d* Second DB
21, 22, 22*a*, 22*b*, 23, 24, 26, 26*a*, 26*b* In-building optical wiring
25, 25*a*, 25*b* Inter-building optical transmission line
40 Endpoint name definition unit
41 ID definition unit
42 Expected value management unit
43 Received value management unit
44 Wiring determination unit

The invention claimed is:

1. A wiring management system comprising:
separate service apparatuses configured to provide various communication services to user terminals via a service network;
a transmission apparatus configured to connect the service apparatuses through a transmission network with a plurality of communication functional units interposed in the transmission network; and
a transmission network management apparatus configured to identify a wiring abnormality of the connected transmission network,
wherein the transmission network management apparatus includes:
a database (DB) configured to store information related to the plurality of communication functional units,
an endpoint name definition unit configured to (i) define endpoint names which are unique names of endpoints as transmitting/receiving ends of the service apparatuses, and endpoint names which are unique names of endpoints as transmitting/receiving ends of the plurality of functional units and (ii) save each of the defined endpoint names in association with an opposite endpoint name which is an endpoint name on an opposite side of the endpoint in the DB,
an ID definition unit configured to define a unique endpoint identification (ID) for each of the endpoints of the service apparatuses and each of the endpoints of the plurality of communication functional units,
an expected value management unit configured to define opposite endpoint IDs on the opposite sides of the endpoints as expected values to associate the endpoint names of the endpoints of the plurality of communication functional units with the opposite endpoint IDs and save the associated endpoint names in pairs with the expected values in the DB,
a received value management unit configured to, upon completing a wiring connection between the service apparatuses, receive an opposite endpoint ID on an opposite side of an endpoint in the plurality of communication functional units via a wiring as a received value, receive an opposite endpoint ID of the service apparatus opposite to a predetermined functional unit among the plurality of communication functional units via a wiring as a received value, and save the received values in pairs with the expected value of the same opposite endpoint ID in the DB, and
a wiring determination unit configured to determine that there is a wiring abnormality based on the received values and the expected value of the same opposite endpoint ID saved in the DB not matching.

2. The wiring management system according to claim 1, wherein:
based on the service network being an Internet protocol (IP) network, the functional unit is configured to receive a signal of an Ethernet frame including a sender address from the service apparatus, and
in a case where the functional unit is configured to perform, based on the received signal being transferred to an optical channel data unit (ODU)/optical channel transport unit (OTU) frame, synchronization processing for extracting the sender address:
the service apparatus is configured to store a media access control (MAC) address of an endpoint of the service apparatus as an endpoint ID in a slot of the sender address of the Ethernet frame, the functional unit is configured to receive the Ethernet frame in which the MAC address is stored, and the functional unit is configured to extract the MAC address stored in the received Ethernet frame as a received value of the opposite endpoint ID and send the value to the transmission network management apparatus.

3. The wiring management system according to claim 1, wherein:

based on the service network being an Ethernet network, the functional unit is configured to receive a signal of a link layer discovery protocol (LLDP) frame or an operations administration maintenance (OAM) frame as an Ethernet frame including a sender address from the service apparatus, and in a case where the functional unit is configured to perform, based on the received signal being transferred to an ODU/OTU frame, synchronization processing for extracting the sender address:

the service apparatus is configured to store a MAC address of an endpoint of the service apparatus as an endpoint ID in a slot of a sender address of the LLDP frame or the OAM frame, the functional unit is configured to receive the LLDP frame or the OAM frame in which the MAC address is stored, and the functional unit is configured to extract the MAC address stored in the received LLDP frame or OAM frame as a received value of the opposite endpoint ID and send the received value to the transmission network management apparatus.

4. The wiring management system according to claim 1, wherein among the plurality of communication functional units, a functional unit without a light emitting element is configured to receive an endpoint ID from a functional unit with a light emitting element via an optical wiring and send the endpoint ID to the transmission network management apparatus.

5. The wiring management system according to claim 1, wherein:

the plurality of communication functional units are connected by a two-core integrated two-core optical fiber, among the plurality of communication functional units, a non-equipped functional unit without a light emitting element includes a return unit configured to return and respond an endpoint ID of an equipped functional unit received from the equipped functional unit with a light emitting element to the equipped functional unit, the transmission network management apparatus includes a second DB configured to save each of the endpoint names in association with the defined endpoint ID for each endpoint corresponding to each of the endpoint names, the wiring determination unit is configured to determine that there is no incorrect connection based on the endpoint IDs before and after returning at the return unit being the same, and in accordance with a determination that there is no incorrect connection, the received value management unit is configured to save the endpoint ID received by the non-equipped functional unit as a received value of an opposite endpoint ID in pairs with an expected value of the same opposite endpoint ID stored in the DB, search for an endpoint ID of the non-equipped functional unit associated with the saved received value from the second DB, and save the searched endpoint ID as a received value of an opposite endpoint ID of the endpoint of the equipped functional unit in pairs with the expected value in the DB.

6. The wiring management system according to claim 1, wherein the wiring determination unit is configured to detect a route location where a new route set between the functional units between the service apparatuses and an existing route between the functional units do not overlap with each other and only the new route is set, and identify the detected route location as a suspected location where an incorrect connection is suspected.

7. A wiring management system comprising:

separate service apparatuses configured to provide various communication services to user terminals via a service network;

a transmission apparatus configured to connect between the service apparatuses through a transmission network with a plurality of communication functional units interposed in the transmission network; and a transmission network management apparatus configured to identify a wiring abnormality of the connected transmission network, wherein the transmission network management apparatus includes:

a first database (DB) configured to save endpoint names which are unique names of endpoints as transmitting/receiving ends of the plurality of functional units, opposite endpoint names of the functional units and the service apparatuses on the opposite side of endpoint names, and an opposite endpoint identification (ID) which is an opposite side of each endpoint name among unique endpoint IDs defined for each endpoint of the service apparatuses and each endpoint of the plurality of communication functional units and save only the endpoint names before a wiring connection between the service apparatuses via the plurality of communication functional units is performed, and a second database (DB) configured to save each endpoint name in association with each defined endpoint ID for each endpoint corresponding to each of the endpoint names, and upon completing the wiring connection, the transmission network management apparatus is configured to receive an opposite endpoint ID of a corresponding side at the endpoints of the plurality of communication functional units, save the received opposite endpoint ID in association with an endpoint name of the same endpoint in the first DB, searches for the endpoint name of the same endpoint as the endpoint of the saved opposite endpoint ID from the second DB, and save the searched endpoint name in association with an opposite endpoint ID of the same endpoint in the first DB as an opposite endpoint name.

8. A wiring management method for wiring and connecting between separate service apparatuses that provide various communication services to user terminals via a service network through a transmission network with a plurality of communication functional units interposed in the transmission network and identifying a wiring abnormality in the connected transmission network by a transmission network management apparatus, wherein the transmission network management apparatus includes a database (DB) configured to store information related to the plurality of communication functional units, the method comprising:

defining endpoint names which are unique names of endpoints as transmitting/receiving ends of the service apparatuses, and endpoint names which are unique names of endpoints as transmitting/receiving ends of the plurality of functional units and saving each of the defined endpoint names in association with an opposite endpoint name which is an endpoint name on an opposite side of the endpoint in the DB, defining a unique endpoint identification (ID) for each of the endpoints of the service apparatuses and each of the endpoints of the plurality of communication functional units, defining opposite endpoint IDs on the opposite sides of the endpoints as expected values and associating the endpoint names of the endpoints of the plurality of communication functional units with the opposite endpoint IDs and saving the associated endpoint names in pairs with the expected values in the DB, upon completing a wiring connection between the service apparatuses, receiving an opposite endpoint ID on an opposite side of an endpoint in the plurality of communication functional units via a wiring as a received value, receiving an opposite endpoint ID of the service apparatus opposite to a predetermined functional unit among the plurality of communication functional units via a wiring as a received value, and saving the received values in pairs with the expected value of the same opposite endpoint ID in the DB, and determining a wiring abnormality based on the received values and the expected value of the same opposite endpoint ID saved in the DB not matching.

* * * * *